United States Patent
Han et al.

(10) Patent No.: US 11,968,558 B2
(45) Date of Patent: Apr. 23, 2024

(54) DATA TRANSMISSION METHOD AND APPARATUS

(71) Applicant: HUAWEI TECHNOLOGIES CO., LTD., Guangdong (CN)

(72) Inventors: Feng Han, Shanghai (CN); Xingxing Hu, Shanghai (CN); Yinghao Jin, Shanghai (CN); Wei Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 17/211,101

(22) Filed: Mar. 24, 2021

(65) Prior Publication Data

US 2021/0211926 A1 Jul. 8, 2021

Related U.S. Application Data

(63) Continuation of application No. PCT/CN2019/099054, filed on Aug. 2, 2019.

(30) Foreign Application Priority Data

Sep. 28, 2018 (CN) .......................... 201811143393.6

(51) Int. Cl.
 H04W 28/02 (2009.01)
 H04W 28/24 (2009.01)
 H04W 76/27 (2018.01)

(52) U.S. Cl.
 CPC ... H04W 28/0268 (2013.01); H04W 28/0257 (2013.01); H04W 28/0263 (2013.01); H04W 28/24 (2013.01); H04W 76/27 (2018.02)

(58) Field of Classification Search
 CPC ............. H04W 28/0252; H04W 28/24; H04W 28/0268; H04W 28/0263; H04W 72/543; H04W 76/27; H04W 28/0257
 See application file for complete search history.

(56) References Cited

U.S. PATENT DOCUMENTS

2019/0075552 A1* 3/2019 Yu .......................... H04W 24/10
2019/0319858 A1* 10/2019 Das ........................ H04W 36/08
(Continued)

FOREIGN PATENT DOCUMENTS

CN 103875275 A 6/2014
CN 105228263 A 1/2016
(Continued)

OTHER PUBLICATIONS

Huawei: "pCR to 38.460 on QoS handling over E1", 3GPP Draft; R3-182132 PCR to 38.460 on QOS Handling Over E1, 3rd Generation Partnership Project (3GPP), Mobile Competence Centre ; vol. RAN WG3, No. Sanya, China; Apr. 16, 2018-Apr. 20, 2018 (Year: 2018).*

(Continued)

Primary Examiner — Mehmood B. Khan
(74) Attorney, Agent, or Firm — HUAWEI TECHNOLOGIES CO., LTD.

(57) ABSTRACT

The present disclosure relates to data transmission methods and apparatus to implement quality of service (QoS) flow-based data transmission in an architecture in which a central unit-control plane (CU-CP) and a central unit-user plane (CU-UP) are separated from each other. In one example method, when receiving data of a QoS flow, the CU-UP may send a QoS flow identity (ID) and a protocol data unit (PDU) session ID that are of the data of the QoS flow to the CU-CP, where a PDU session corresponding to the PDU session ID includes the data of the QoS flow.

20 Claims, 6 Drawing Sheets

(56) References Cited

U.S. PATENT DOCUMENTS

| | | | |
|---|---|---|---|
| 2019/0349139 A1* | 11/2019 | Park | H04W 76/27 |
| 2019/0356450 A1 | 11/2019 | He et al. | |
| 2019/0356453 A1 | 11/2019 | Li et al. | |
| 2019/0357076 A1 | 11/2019 | Han et al. | |
| 2020/0120725 A1* | 4/2020 | Mildh | H04W 76/12 |
| 2020/0154498 A1* | 5/2020 | Wang | H04W 80/08 |
| 2020/0169913 A1* | 5/2020 | Byun | H04W 76/15 |
| 2021/0022031 A1* | 1/2021 | Liu | H04W 28/0252 |
| 2022/0078808 A1* | 3/2022 | Luo | H04W 72/1221 |
| 2023/0180349 A1* | 6/2023 | Zhu | H04W 4/06 370/312 |

FOREIGN PATENT DOCUMENTS

| | | |
|---|---|---|
| CN | 107690159 A | 2/2018 |
| CN | 107889155 A | 4/2018 |
| CN | 108282868 A | 7/2018 |
| CN | 108390746 A | 8/2018 |
| CN | 108390830 A | 8/2018 |
| CN | 108430077 A | 8/2018 |
| CN | 108476508 A | 8/2018 |
| CN | 108513325 A | 9/2018 |
| CN | 108541032 A | 9/2018 |
| CN | 108811153 A | 11/2018 |
| EP | 3522589 A1 | 8/2019 |
| EP | 3570582 A1 | 11/2019 |
| EP | 3582576 A1 | 12/2019 |
| JP | 2020511893 A | 4/2020 |
| JP | 2020532913 A | 11/2020 |
| WO | 2018009340 A1 | 1/2018 |
| WO | 2018130026 A1 | 7/2018 |
| WO | 2018137711 A1 | 8/2018 |
| WO | 2018145526 A1 | 8/2018 |
| WO | 2018145879 A1 | 8/2018 |
| WO | 2018171398 A1 | 9/2018 |

OTHER PUBLICATIONS

"3rd Generation Partnership Project; Technical Specification Group Radio Access Network; NG-RAN; E1 Application Protocol (E1 AP) (Release 15)", EPO Form 1703 01 .91 TRI 3GPP Standard; Technical Specification; 3GPP TS 38.463, vol. RAN WG3, No. V15.1.0, Sep. 25, 2018 (Sep. 25, 2018) (Year: 2018).*

3GPP TS 38.463 V15.1.0 (Sep. 2018), "3rd Generation Partnership Project; Technical Specification Group Radio Access Network; NG-RAN; E1 Application Protocol (E1AP) (Release 15), " Sep. 2018, 152 pages.

ZTE, "Reflective QoS impact on E1 interface," 3GPP TSG-RAN WG3 #98, R3-174413, Reno, NV, USA, Nov. 27-Dec. 1, 2017, 4 pages.

Extended European Search Report in European Application No. 19865768.6, dated Sep. 21, 2021, 16 pages.

NEC, "NR Corrections (38.401 Baseline CR covering RAN3-101 agreements)," 3GPP TSG-RAN WG3 #101, R3-185316, Gothenburg, Sweden, Aug. 20-24, 2018, 36 pages.

EP Communication Pursuant to Article 94(3) EPC in European Appln No. 19865768.6, dated May 9, 2023, 10 pages.

LG Electronics Inc., KT Corp., "Discussion on Bearer Context Modification," 3GPP TSG-RAN WG3 Meeting #99bis, R3-182056, Sanya, China, Apr. 16-20, 2018, 5 pages.

Office Action issued in Japanese Application No. 2021-517258 dated Jun. 28, 2022, 6 pages (with English translation).

3GPP TS 38.300 V15.3.0 (Sep. 2018), "3rd Generation Partnership Project; Technical Specification Group Radio Access Network;NR; NR and NG-RAN Overall Description;Stage 2(Release 15)," Sep. 2018, 92 pages.

3GPP TS 38.401 V15.3.0 (Sep. 2018), "3rd Generation Partnership Project; Technical Specification Group Radio Access Network; NG-RAN; Architecture description (Release 15)," Sep. 2018, 39 pages.

3GPP TS 38.460 V15.1.0 (Sep. 2018), "3rd Generation Partnership Project; Technical Specification Group Radio Access Network; NG-RAN; E1 general aspects and principles (Release 15)," Sep. 2018, 10 pages.

3GPP TS 38.463 V15.0.0 (Jun. 2018), "3rd Generation Partnership Project; Technical Specification Group Radio Access Network; NG-RAN; E1 Application Protocol (E1AP)," Jun. 2018, 132 pages.

3GPP TS 38.473 V15.3.0 (Sep. 2018), "3rd Generation Partnership Project; Technical Specification Group Radio Access Network; NG-RAN; F1 application protocol (F1AP)(Release 15)," Sep. 2018, 176 pages.

Ericsson et al., "Establishment of DRB QoS in CU-DU architecture," 3GPP TSG-RAN WG3 Meeting #99bis, R3-182208, Sanya, China, Apr. 16-20, 2018, 18 pages.

Huawei, "Bearer Management over F1," 3GPP TSG RAN WG3 NR AdHoc,R3-172189 , Qingdao, China, Jun. 27-29, 2017, 2 pages.

Huawei, "pCR to 38.460 on QoS handling over E1," 3GPP TSG-RAN3 Meeting #99bis, R3-182132, Sanya, China, Apr. 16-20, 2018, 5 pages.

Huawei, "Separate DL and UL Flow to DRB mapping in Handover," 3GPP TSG-RAN3 Meeting #101, R3-184864, Gothenburg, Sweden, Aug. 20-24, 2018, 2 pages.

Huawei, HiSilicon, "DL and UL QoS Flow to DRB mapping," 3GPP TSG-RAN WG2 Meeting#AH-1807, R2-1809974, Montreal, Canada, Jul. 2-6, 2018, 3 pages.

LG Electronics Inc., KT Corp., "Bearer Context Modification Required procedure," 3GPP TSG-RAN WG3 #100, R3-182844, Busan, South Korea, May 21-25, 2018, 5 pages.

LG Electronics Inc., "Reflective QoS support in E1 interface," 3GPP TSG-RAN WG3 #100, R3-182845, Busan, South Korea, May 21-25, 2018, 12 pages.

Nokia, "List of NG functions and NG specifications for TS 38.410," 3GPP TSG-RAN WG3 NR#2 Adhoc, R3-172139 Qingdao, P.R. China, Jun. 27-29, 2017, 2 pages.

Office Action issued in Chinese Application No. 201910619859.3 dated Feb. 6, 2020, 13 pages (with English translation).

Office Action issued in Chinese Application No. 201910619859.3 dated Apr. 28, 2020, 15 pages (with English translation).

Office Action issued in Chinese Application No. 201910620024.X dated Mar. 25, 2020, 8 pages.

PCT International Search Report and Written Opinion issued in International Application No. PCT/CN2019/099054 dated Oct. 28, 2019, 13 pages (partial English translation).

Search Report issued in Chinese Application No. 201910620024.X dated Oct. 22, 2019, 9 pages.

Search Report issued in Chinese Application No. 201910619859.3 dated Oct. 22, 2019, 7 pages.

Office Action in Japanese Appln. No. 2021-517258, dated Oct. 11, 2022, 6 pages (with English translation).

LG Electronics Inc., Discussion on DRB modification procedure. 3GPP TSG-RAN WG3 #99, Athens, Greece, Feb. 26-Mar. 2, 2018, R3-181071, 4 pages.

Ericsson, Vodafone, (TP for SA BL CR) DRB Qos Setup over F1-C. 3GPP TSG-RAN WG3 Meeting #99, Athens, Greece, Feb. 26-Mar. 2, 2018, R3-181277, 16 pages.

* cited by examiner

DATA TRANSMISSION METHOD AND APPARATUS

CROSS-REFERENCE TO RELATED APPLICATIONS

This application is a continuation of International Application No. PCT/CN2019/099054, filed on Aug. 2, 2019, which claims priority to Chinese Patent Application No. 201811143393.6, filed on Sep. 28, 2018. The disclosures of the aforementioned applications are hereby incorporated by reference in their entireties.

TECHNICAL FIELD

This application relates to the communications field, and more specifically, to a data transmission method and an apparatus in the communications field.

BACKGROUND

With comprehensive development and gradual deepening of researches on a next-generation communications system, the industry reaches a basic consensus on specific content of researches on 5G. The 5G supports various types of network deployment and application types, including higher-rate experience and a higher-bandwidth access capability, lower-latency high-reliability information exchange, and access and management of a massive low-cost MTC device.

It is defined in a current standard that an access network device may use an architecture in which a central unit (CU) is separated from a distributed unit (DU). In addition, in the CU-DU architecture, a new architecture is further added. For a CU part, the CU may be classified into a central unit-control plane (CU-CP) and a distributed unit-user plane (CU-UP). A CU-CP part includes a radio resource control (RRC) function and a control plane part of a packet data convergence protocol (PDCP). A CU-UP part includes a data plane part of the CU, and mainly includes a data plane part of a protocol stack of a service data adaptation protocol (SDAP) and a data plane part of a protocol stack of the PDCP.

Based on this, how to implement data transmission based on a quality of service flow (QoS flow) in an architecture in which the CU-CP is separated from the CU-UP is an urgent problem to be resolved.

SUMMARY

This application provides a data transmission method and an apparatus, to implement quality of service QoS flow-based data transmission in an architecture in which a CU-CP and a CU-UP are separated from each other.

According to a first aspect, a data transmission method is provided. The method includes:

receiving, by a central unit-user plane CU-UP of a radio access network RAN, data of a quality of service QoS flow; and sending, by the CU-UP, first information to a central unit-control plane CU-CP of the radio access network RAN, where the first information includes a QoS flow identity ID and a PDU session ID that are of the data of the QoS flow, and a PDU session corresponding to the PDU session ID includes the data of the QoS flow.

Therefore, in this embodiment of this application, in a scenario in which the CU-CP and the CU-UP are separated from each other, when receiving the data of the quality of service QoS flow, the CU-UP may send the QoS flow identity ID and the PDU session ID that are of the data of the QoS flow to the CU-CP, and the PDU session corresponding to the PDU session ID includes the data of the QoS flow. In this way, the CU-CP can determine a manner of mapping the data of the QoS flow to a radio bearer, so that a transmission performance parameter of the QoS flow is met, and user experience is improved.

With reference to the first aspect, in some implementations of the first aspect, the data of the QoS flow corresponds to a first data radio bearer DRB, and the receiving, by a central unit-user plane CU-UP of a radio access network, data of a QoS flow includes:

receiving, by the CU-UP, the data of the QoS flow from a terminal device by using the first DRB; or receiving, by the CU-UP from a core network, the data of the QoS flow that needs to be transmitted by using the first DRB.

With reference to the first aspect, in some implementations of the first aspect, the method further includes: receiving, by the CU-UP, second information from the CU-CP, where the second information is used to indicate that the data of the QoS flow corresponds to a second DRB instead of corresponding to the first DRB. In this way, subsequently, when receiving the data of the QoS flow from the terminal device by using the second DRB, or when receiving the data of the QoS flow from the core network, the CU-UP maps the data of the QoS flow to the second DRB for transmission.

Optionally, the second information may include a DRB ID of the second DRB and the QoS flow ID, and optionally may further include QoS parameters of the QoS flow.

With reference to the first aspect, in some implementations of the first aspect, the first DRB is a default DRB, and the second DRB is a dedicated DRB.

When the first DRB is the default DRB, when the CU-UP receives data of a QoS flow from the default DRB, the CU-UP notifies the CU-CP that the data of the QoS flow arrives, so that the CU-CP sets up a new dedicated DRB for the QoS flow, or maps the data of the QoS flow to another existing dedicated DRB, thereby implementing a remapping procedure of the QoS flow from the default DRB to the dedicated DRB.

With reference to the first aspect, in some implementations of the first aspect, the first information further includes a DRB ID of the first DRB.

Optionally, in another implementation of this application, the first information may not include the DRB ID of the first DRB. In other words, the CU-UP may not need to notify the CU-CP of the DRB ID of the first DRB, but only needs to notify the CU-CP of a QoS flow ID list in the foregoing PDU session. In this case, additional signaling overheads can be reduced.

With reference to the first aspect, in some implementations of the first aspect, when the CU-UP receives the data of the QoS flow from the terminal device, the first information further includes an uplink indication; or when the CU-UP receives the data of the QoS flow from the core network, the first information further includes a downlink indication.

Specifically, the uplink indication may be used to indicate that a transmission direction is uplink, or used to indicate that the data of the QoS flow is uplink data of the QoS flow. The downlink indication may be used to indicate that the transmission direction is downlink, or used to indicate that the data of the QoS flow is downlink data of the QoS flow.

In this case, the CU-UP may clearly notify the CU-CP whether the data of the QoS flow is uplink data or downlink data.

Alternatively, optionally, the CU-UP only notifies the CU-CP that the data of the QoS flow arrives, and does not notify the CU-CP whether the data of the QoS flow is uplink data of the QoS flow or downlink data of the QoS flow. In other words, in this case, the CU-CP and the CU-UP do not need to distinguish whether the data of the QoS flow is uplink data or downlink data.

According to a second aspect, a data transmission method is provided. The method includes:

receiving, by a central unit-control plane CU-CP of a radio access network RAN, first information from a central unit-user plane CU-UP of the radio access network, where the first information includes a QoS flow identity ID and a PDU session ID that are of data of a QoS flow, and a PDU session corresponding to the PDU session ID includes the data of the QoS flow; and using, by the CU-CP, the first information.

Therefore, in this embodiment of this application, in a scenario in which the CU-CP and the CU-UP are separated from each other, when receiving the data of the quality of service QoS flow, the CU-UP may send the QoS flow identity ID and the PDU session ID that are of the data of the QoS flow to the CU-CP, and the PDU session corresponding to the PDU session ID includes the data of the QoS flow. In this way, the CU-CP can determine a manner of mapping the data of the QoS flow to a radio bearer, so that a transmission performance parameter of the QoS flow is met, and user experience is improved.

Specifically, the CU-CP obtains information included in the first information, and determines, based on the information included in the first information, that the data of the QoS flow arrives. Further, the CU-CP may determine to continue to keep a mapping relationship that is between the QoS flow and a first DRB and that is included in the first information, or the CU-CP changes the first DRB corresponding to the QoS flow to a second DRB.

Optionally, when the CU-CP determines to continue to keep the mapping relationship that is between the QoS flow and the first DRB and that is included in the first information unchanged, the CU-CP may not perform another operation.

With reference to the second aspect, in some implementations of the second aspect, when the CU-CP determines to change the first DRB corresponding to the QoS flow to the second DRB, the method further includes: sending, by the CU-CP, second information to the CU-UP, where the second information is used to indicate that the data of the QoS flow corresponds to the second DRB instead of corresponding to the first DRB. In this way, a DU may obtain a mapping relationship between the QoS flow and the second DRB, to perform uplink and downlink scheduling on user equipment by using the second DRB.

Optionally, the second information may include a DRB ID of the second DRB and the QoS flow ID, and optionally may further include QoS parameters of the QoS flow.

In an implementation, the CU-CP may send an F1-C message to the DU, where an RRC message sent to a terminal device is encapsulated in the F1-C message, and the RRC message may include the second information.

With reference to the second aspect, in some implementations of the second aspect, the first DRB is a default DRB, and the second DRB is a dedicated DRB.

When the first DRB is the default DRB, when the CU-UP receives data of a QoS flow from the default DRB, the CU-UP notifies the CU-CP that the data of the QoS flow arrives, so that the CU-CP sets up a new dedicated DRB for the QoS flow, or maps the data of the QoS flow to another existing dedicated DRB, thereby implementing a remapping procedure of the QoS flow from the default DRB to the dedicated DRB.

With reference to the second aspect, in some implementations of the second aspect, the first information further includes a DRB ID of the first DRB.

With reference to the second aspect, in some implementations of the second aspect, the first information further includes an uplink indication, and the uplink indication is used to indicate that the data of the QoS flow is uplink data; or the first information further includes a downlink indication, and the downlink indication is used to indicate that the data of the QoS flow is downlink data.

According to a third aspect, a data transmission method is provided. The method includes:

determining, by a central unit CU, a mapping relationship between a quality of service QoS flow and a DRB, where the mapping relationship includes at least one of the following: a mapping relationship between an uplink QoS flow and the DRB, a mapping relationship between a downlink QoS flow and the DRB, or a mapping relationship between a bidirectional QoS flow and the DRB; and sending, by the CU, third information to a distributed unit DU, where the third information includes the mapping relationship between a QoS flow and a DRB.

Therefore, in this embodiment of this application, the CU determines an asymmetric mapping relationship between a QoS flow and a DRB, and notifies the DU of the asymmetric mapping relationship, thereby implementing flexible uplink QoS flow mapping and downlink QoS flow mapping, and decoupling the mapping relationship between an uplink QoS flow and the DRB from the mapping relationship between a downlink QoS flow and the DRB. In this way, requirements for uplink transmission and downlink transmission of a QoS flow can be separately guaranteed (a guaranteed bit rate of uplink transmission of the QoS flow is different from a guaranteed bit rate of downlink transmission of the QoS flow, and a maximum bit rate of uplink transmission of the QoS flow is different from a maximum bit rate of downlink transmission of the QoS flow). In addition, a network may flexibly configure uplink mapping and downlink mapping of the QoS flow based on uplink/downlink network load, an uplink/downlink interference status, an uplink/downlink QoS flow parameter feature, and the like, thereby further improving user experience.

With reference to the third aspect, in some implementations of the third aspect, the CU includes a central unit-user plane CU-UP and a central unit-control plane CU-CP that are separated from each other, where the determining, by a central unit CU, a mapping relationship between a quality of service QoS flow and a DRB includes: determining, by the CU-CP, the mapping relationship between a QoS flow and a DRB; and the sending, by the CU, third information to a distributed unit DU includes: sending, by the CU-CP, the third information to the DU.

After receiving the third information, the DU records the mapping relationship indicated by the third information. Configuration parameters of media access control (MAC) layers and radio link control (RLC) layers of DRBs that correspond to an uplink QoS flow and a downlink QoS flow and that are indicated by the third information are separately determined, and configuration parameters of a media access control layer and a radio link control layer of a DRB that corresponds to an uplink QoS flow or a downlink QoS flow and that is indicated by the third information are separately determined. In a possible implementation, the DU separately performs uplink scheduling and downlink scheduling at the MAC layer based on the QoS flow in the DRB.

The method further includes: sending, by the CU-CP, the third information to the CU-UP.

After receiving the third information, the CU-UP records the mapping relationship indicated by the third information. When receiving downlink data of the QoS flow sent by a core network, the CU-UP may map the downlink data of the QoS flow to a corresponding DRB based on a mapping relationship that is between a downlink QoS flow ID and a DRB and that is indicated by the third information, to transmit the downlink data of the QoS flow to the DU. When receiving uplink data of the QoS flow sent by a terminal device, the CU-UP may verify, based on the mapping relationship that is between an uplink QoS flow ID and a DRB and that is indicated by the third information, whether the uplink data of the QoS flow is transmitted on a corresponding DRB.

With reference to the third aspect, in some implementations of the third aspect, the sending, by the CU-CP, the third information to the CU-UP includes:

sending, by the CU-CP, a bearer context setup request or a bearer context modification request to the CU-UP, where the bearer context setup request or the bearer context modification request includes the third information; and the sending, by the CU-CP, the third information to the DU includes:

sending, by the CU-CP, a user equipment UE context setup request or a UE context modification request to the DU, where the UE context setup request or the UE context modification request includes the third information.

With reference to the third aspect, in some implementations of the third aspect, the third information may further include a mapping indication, used to indicate whether data that is in the QoS flow and that is mapped to the DRB is uplink data or downlink data (indication whether the UL data or DL data of one QoS flow map to this DRB), or indicate that data that is in the QoS flow and that is mapped to the DRB is uplink data and downlink data.

Optionally, in this embodiment of this application, the third information may further include an asymmetric mapping indication, used to indicate whether data that is in the QoS flow and that is mapped to the DRB is uplink data or downlink data (indication whether the UL data or DL data of one QoS flow map to this DRB).

In this way, the CU-CP may explicitly indicate to the CU-UP whether the QoS flow in the mapping relationship is an uplink QoS flow, a downlink QoS flow, or a bidirectional QoS flow.

Optionally, in this embodiment of this application, the CU-CP may alternatively implicitly indicate to the CU-UP whether the QoS flow in the mapping relationship is an uplink QoS flow, a downlink QoS flow, or a bidirectional QoS flow.

Therefore, in this embodiment of this application, the CU-CP determines the asymmetric mapping relationship between a QoS flow and a DRB, and notifies the CU-UP and the DU of the asymmetric mapping relationship, thereby implementing flexible uplink QoS flow mapping and downlink QoS flow mapping, and decoupling the mapping relationship between an uplink QoS flow and the DRB from the mapping relationship between a downlink QoS flow and the DRB. In this way, requirements for uplink transmission and downlink transmission of the QoS flow can be separately guaranteed (the guaranteed bit rate of uplink transmission of the QoS flow is different from the guaranteed bit rate of downlink transmission of the QoS flow, and the maximum bit rate of uplink transmission of the QoS flow is different from the maximum bit rate of downlink transmission of the QoS flow). In addition, the network may flexibly configure uplink mapping and downlink mapping of the QoS flow based on the uplink/downlink network load, the uplink/downlink interference status, the uplink/downlink QoS flow parameter feature, and the like, thereby further improving user experience.

According to a fourth aspect, a data transmission method is provided. The method includes:

receiving, by a distributed unit DU of a radio access network, third information from a central unit CU, where the third information includes a mapping relationship between a QoS flow and a DRB, and the mapping relationship includes at least one of the following: a mapping relationship between an uplink QoS flow and the DRB, a mapping relationship between a downlink QoS flow and the DRB, or a mapping relationship between a bidirectional QoS flow and the DRB; and using, by the DU, the third information.

Therefore, in this embodiment of this application, the CU determines an asymmetric mapping relationship between a QoS flow and a DRB, and notifies the DU of the asymmetric mapping relationship, thereby implementing flexible uplink QoS flow mapping and downlink QoS flow mapping, and decoupling the mapping relationship between an uplink QoS flow and the DRB from the mapping relationship between the downlink QoS flow and the DRB. In this way, requirements for uplink transmission and downlink transmission of a QoS flow can be separately guaranteed (a guaranteed bit rate of uplink transmission of the QoS flow is different from a guaranteed bit rate of downlink transmission of the QoS flow, and a maximum bit rate of uplink transmission of the QoS flow is different from a maximum bit rate of downlink transmission of the QoS flow). In addition, a network may flexibly configure uplink mapping and downlink mapping of the QoS flow based on uplink/downlink network load, an uplink/downlink interference status, an uplink/downlink QoS flow parameter feature, and the like, thereby further improving user experience.

With reference to the fourth aspect, in some implementations of the fourth aspect, the CU includes a central unit-user plane CU-UP and a central unit-control plane CU-CP that are separated from each other, and the receiving, by a distributed unit DU of a radio access network, third information from a CU includes:

receiving, by the DU, the third information from the CU-CP.

After receiving the third information, the DU records the mapping relationship indicated by the third information. Configuration parameters of media access control (MAC) layers and radio link control (RLC) layers of DRBs that correspond to an uplink QoS flow and a downlink QoS flow and that are indicated by the third information are separately determined, and configuration parameters of a media access control layer and a radio link control layer of a DRB that corresponds to an uplink QoS flow or a downlink QoS flow and that is indicated by the third information are separately determined. In a possible implementation, the DU separately performs uplink scheduling and downlink scheduling at the MAC layer based on the QoS flow in the DRB.

With reference to the fourth aspect, in some implementations of the fourth aspect, the receiving, by the DU, the third information from the CU-CP includes:

receiving, by the DU, a user equipment UE context setup request or a UE context modification request from the CU-CP, where the UE context setup request or the UE context modification request includes the third information.

With reference to the fourth aspect, in some implementations of the fourth aspect, when the mapping relationship includes the mapping relationship between an uplink QoS flow and a DRB, the third information further includes an uplink indication.

When the mapping relationship includes the mapping relationship between a downlink QoS flow and the DRB, the third information further includes a downlink indication.

When the mapping relationship includes the mapping relationship between a bidirectional QoS flow and the DRB, the third information further includes a bidirectional indication.

According to a fifth aspect, a data transmission method is provided. The method includes:

determining, by a core network CN, a direction of a QoS flow, where the direction of the QoS flow includes only an uplink QoS flow, only a downlink QoS flow, or a bidirectional QoS flow; and sending, by the core network, fourth information to a RAN, where the fourth information is used to indicate the direction of the QoS flow.

Herein, the RAN may be specifically a CU-CP or a CU.

In a possible implementation, the fourth information includes a PDU session ID, a QoS flow ID, and a directional characteristic of a QoS flow corresponding to the QoS flow ID. Herein, the directional characteristic is, for example, uplink, downlink, or bidirectional.

In addition, when the QoS flow is an uplink QoS flow, the fourth information may further include an uplink QoS parameter of the QoS flow, where the uplink QoS parameter is a QoS parameter configured for the QoS flow during uplink transmission. When the QoS flow is a downlink QoS flow, the fourth information may further include a downlink QoS parameter of the QoS flow, where the downlink QoS parameter is a QoS parameter configured for the QoS flow during downlink transmission. When the QoS flow is a bidirectional QoS flow, the fourth information may further include a UL QoS parameter and a DL QoS parameter of the QoS flow.

Therefore, in this embodiment of this application, an access network device may independently configure uplink transmission and downlink transmission of the QoS flow based on the determined direction of the QoS flow. Specifically, if the QoS flow is only an uplink QoS flow, the access network device determines a scheduling policy of an uplink data packet of the QoS flow, and does not need to consider downlink transmission. If the QoS flow is only a downlink QoS flow, the access network device determines a scheduling policy of a downlink data packet of the QoS flow, and does not need to consider uplink transmission. Therefore, in this embodiment of this application, a particular requirement of the QoS flow can be met.

According to a sixth aspect, a data transmission method is provided. The method includes:

determining, by a core network CN, a direction of a QoS flow;

receiving, by a RAN, fourth information from the core network, where the fourth information is used to indicate the direction of the QoS flow, and the direction of the QoS flow includes only an uplink QoS flow, only a downlink QoS flow, or a bidirectional QoS flow; and using, by the RAN, the fourth information, where specifically, the RAN obtains information included in the fourth information, and determines a directional characteristic of the QoS flow based on the information included in the fourth information.

Herein, the RAN may be specifically a CU-CP or a CU.

Therefore, in this embodiment of this application, an access network device may independently configure uplink transmission and downlink transmission of the QoS flow based on the determined direction of the QoS flow. Specifically, if the QoS flow is only an uplink QoS flow, the access network device determines a scheduling policy of an uplink data packet of the QoS flow, and does not need to consider downlink transmission. If the QoS flow is only a downlink QoS flow, the access network device determines a scheduling policy of a downlink data packet of the QoS flow, and does not need to consider uplink transmission. Therefore, in this embodiment of this application, a particular requirement of the QoS flow can be met.

According to a seventh aspect, an apparatus is provided. The apparatus may be a radio access network device, a network element or a module in a radio access network device, a chip in a radio access network device, or a chip in a network or a module in a radio access network device. The apparatus has functions of implementing the first aspect to the sixth aspect and various possible implementations of any aspect. The function may be implemented by hardware, or may be implemented by hardware executing corresponding software. The hardware or the software includes one or more modules corresponding to the functions.

In a possible design, the apparatus includes a transceiver module. Optionally, the apparatus further includes a processing module. The transceiver module may be, for example, at least one of a transceiver, a receiver, and a transmitter. The transceiver module may include a radio frequency circuit or an antenna. The processing module may be a processor. Optionally, the apparatus further includes a storage module, and the storage module may be, for example, a memory. When the apparatus includes the storage module, the storage module is configured to store an instruction. The processing module is connected to the storage module, and the processing module may execute the instruction stored in the storage module or an instruction from another module, to enable the apparatus to perform the communication method according to the first aspect to the sixth aspect and various possible implementations of any aspect. In this design, the apparatus may be a radio access network device, or a module, a network element, or a function in a radio access network device.

In another possible design, when the apparatus is a chip, the chip includes a transceiver module. Optionally, the apparatus further includes a processing module. The transceiver module may be, for example, an input/output interface, a pin, or a circuit on the chip. The processing module may be a processor. The processing module may execute an instruction, to enable the chip in the terminal performs the communication method according to any one of the first aspect to the sixth aspect and the possible implementations. Optionally, the processing module may execute an instruction in a storage module, and the storage module may be a storage module in the chip, for example, a register or a cache. Alternatively, the storage module may be located inside a communications device, but located outside the chip, for example, a read-only memory (ROM) or another type of static storage device that can store static information and the instruction, or a random access memory (RAM).

Any processor mentioned above may be a general-purpose central processing unit (CPU), a microprocessor, an application-specific integrated circuit (ASIC), or one or more integrated circuits for controlling program execution of the communication method according to each aspect of the first aspect to the sixth aspect.

According to an eighth aspect, a computer storage medium is provided. The computer storage medium stores program code, and the program code is used to execute an instruction for the method according to any one of the first aspect to the sixth aspect or the possible implementations of the first aspect to the sixth aspect.

According to a ninth aspect, a computer program product including an instruction is provided. When the computer program product is run on a computer, the computer is enabled to perform the method according to any one of the first aspect to the sixth aspect or the possible implementations of the first aspect to the sixth aspect.

According to a tenth aspect, a communications system is provided. The communications system includes apparatuses that have functions of implementing the method and the possible design according to any one of the first aspect to the sixth aspect, and a combination of the apparatuses.

According to an eleventh aspect, a processor is provided. The processor is configured to be coupled to a memory, and is configured to perform the method according to any one of the first aspect to the sixth aspect or any possible implementation of the first aspect to the sixth aspect.

According to a twelfth aspect, a chip is provided. The chip includes a processor and a communications interface. The communications interface is configured to communicate with an external component or an internal component. The processor is configured to implement the method according to any one of the first aspect to the sixth aspect or any possible implementation of the first aspect to the sixth aspect.

Optionally, the chip may further include a memory. The memory stores an instruction, and the processor is configured to execute the instruction stored in the memory or an instruction derived from another device. When the instruction is executed, the processor is configured to implement the method according to any one of the first aspect to the sixth aspect or any possible implementation of the first aspect to the sixth aspect.

Optionally, the chip may be integrated into a network device.

DESCRIPTION OF EMBODIMENTS

The following describes technical solutions of this application with reference to the accompanying drawings.

The technical solutions in the embodiments of this application may be applied to a fifth generation (5G) mobile communications system or a future evolved mobile communications system.

Figure 1:
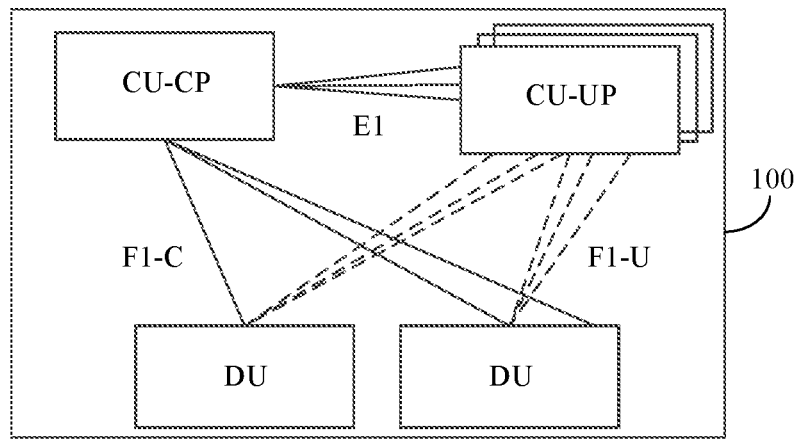
FIG. 1 is a schematic diagram of a radio access network to which an embodiment of this application is applied.

FIG. 1 is a schematic diagram of a radio access network (RAN) 100 to which an embodiment of this application is applied. In this embodiment of this application, the radio access network may include various forms of base stations, macro base stations, micro base stations (also referred to as small cells), relay stations, access points, new radio controllers (NR controller), centralized network elements (centralized unit), remote radio modules, distributed network elements, transmission reception points (TRP), or transmission points (TP), or any other radio access device. However, this embodiment of this application is not limited thereto. A name of a device having a radio access function may vary with different radio access technologies used in a system. For example, a radio access network device may be a next generation NodeB (gNB) in the 5G mobile communications system or a base station in a future mobile communications system. A specific technology and a specific device form that are used by the radio access network are not limited in this embodiment of this application.

The radio access network in this embodiment of this application is used to provide a wireless communication function for a terminal device. Herein, the terminal device may also be referred to as a terminal, user equipment (UE), a mobile station (MS), a mobile terminal (MT), or the like. The terminal device may be a sensor loaded on a vehicle in a V2X communications system, a vehicle-mounted terminal, a wireless terminal in a self driving system, a wireless terminal in a transportation safety system, or the like. A specific technology and a specific device form that are used by the terminal device are not limited in this embodiment of this application.

In a radio access network architecture in which a central unit CU and a distributed unit are separated from each other, the central unit CU may be further classified into a central unit-control plane CU-CP and one or more distributed unit-user planes CU-UPs. As shown in FIG. 1, the radio access network 100 includes one CU-CP, a plurality of CU-UPs, and a plurality of distributed units DUs. The CU-UP, the CU-CP, and the DU may be disposed on different physical devices. This is not limited in this embodiment of this application.

Specifically, one DU may be connected to only one CU-CP, one CU-UP may be connected to only one CU-CP, one DU may be connected to a plurality of CU-UPs under control of a same CU-CP, and one CU-UP may be connected to a plurality of DUs under control of a same CU-CP. An open interface, E1 interface, exists between the CU-CP and the CU-UP. The CU-CP may communicate with the CU-UP through the E1 interface. In addition, an interface exists between the CU-CP and the DU, and an interface exists between the CU-UP and the DU. For example, the interface between the CU-CP and the DU is an F1-C interface, and the interface between the CU-UP and the DU is an F1-U interface.

In this embodiment of this application, the CU-CP includes a control plane part of the CU, and includes an RRC function and a control plane part of a PDCP, for example, data used to process a signaling radio bearer (SRB). The CU-UP includes a user plane part of the CU, and includes a data plane part of a protocol stack of an SDAP and a data plane part of a protocol stack of the PDCP, for example, data used to process a data radio bearer (DRB). The DU includes an RLC layer, a MAC layer, and a PHY layer.

Figure 2:
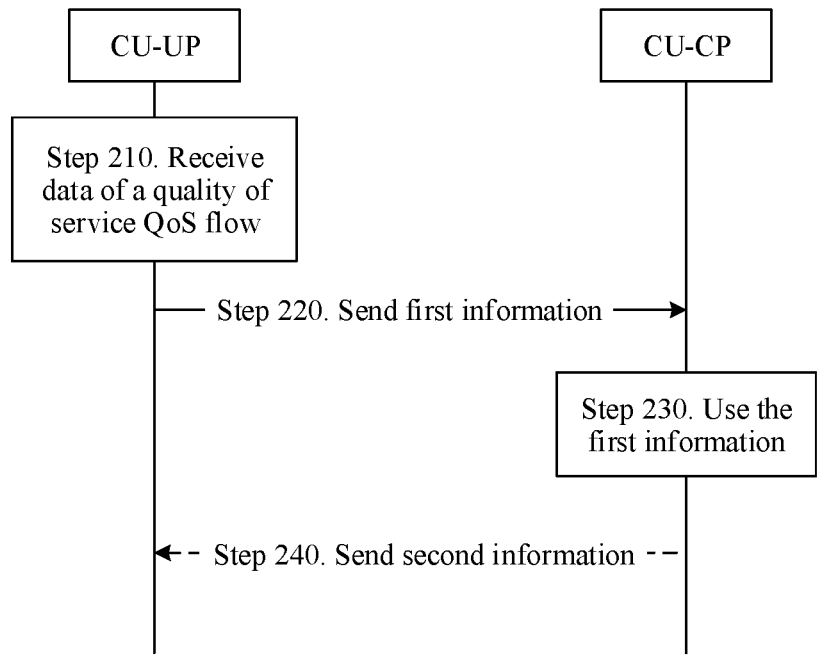
FIG. 2 is a schematic flowchart of a data transmission method according to an embodiment of this application.

FIG. 2 is a schematic flowchart of a data transmission method according to an embodiment of this application. In this embodiment of this application, in a scenario in which a CU-CP and a CU-UP are separated from each other, when receiving data of a quality of service QoS flow, the CU-UP may send related information of the data of the QoS flow to the CU-CP, to notify the CU-CP that the data of the QoS flow arrives, so that the CU-CP can determine a manner of mapping the data of the QoS flow to a radio bearer. Specifically, for the CU-CP and the CU-UP in FIG. 2, refer to the descriptions in FIG. 1. To avoid repetition, details are not described herein again. The method in FIG. 2 includes steps 210 and 220.

Step 210. The CU-UP receives the data of the quality of service QoS flow.

Specifically, the CU-UP may receive the data of the QoS flow from a terminal device, or may receive the data of the QoS flow from a core network. It should be noted that in this embodiment of this application, when the CU-UP receives the data of the QoS flow from the terminal device, a data transmission direction is an uplink direction. In this case, the data of the QoS flow may be referred to as uplink data of the QoS flow. When the CU-UP receives the data of the QoS flow from the core network, the data transmission direction is a downlink direction. In this case, the data of the QoS flow may be referred to as downlink data of the QoS flow.

In this embodiment of this application, the data of the QoS flow corresponds to a first DRB. In other words, the data of the QoS flow is transmitted by using the first DRB. For example, when the data transmission direction is the uplink direction, that the CU-UP receives the data of the quality of service QoS flow may be specifically that the CU-UP receives the data of the QoS flow from the terminal device by using the first DRB, or the CU-UP receives the data of the QoS flow that is from the terminal device and that is transmitted by using the first DRB. In this case, the data of the QoS flow is data that has been sent to the CU-UP by using the first DRB.

When the data transmission direction is the downlink direction, that the CU-UP receives the data of the quality of service QoS flow may be replaced with that the CU-CP receives the data of the QoS flow that is from the core network and that needs to be transmitted by using the first DRB, or the CU-CP receives the data of the QoS flow that is from the core network and that is transmitted by using the first DRB to the terminal device. In this case, the data of the QoS flow is sent by the core network to the CU-UP, and the CU-UP needs to map, based on a mapping relationship between the data of the QoS flow and the first DRB, the data of the QoS flow to the first DRB for transmission.

It should be noted that the received data of the QoS flow herein may include data of one QoS flow, or include data of a plurality of QoS flows. This is not limited in this embodiment of this application.

Optionally, in this embodiment of this application, the first DRB is a default DRB. Specifically, a network device configures a default DRB for each PDU session. If a data packet of the QoS flow is not explicitly used by an RRC configuration to transmit a mapping relationship between the QoS flow and a DRB, and no reflective QoS is used to indicate the mapping relationship between the QoS flow and a DRB, the data packet is transmitted by using the default DRB.

Step 220. The CU-UP sends first information to the CU-CP, where the first information includes a QoS flow identity ID and a PDU session ID that are of the data of the QoS flow, and a PDU session corresponding to the PDU session ID includes the data of the QoS flow. Herein, there may be one or more QoS flow identities IDs.

In this embodiment of this application, when the first DRB is the default DRB, that the CU-UP receives the data of the quality of service QoS flow and sends the QoS flow ID and the PDU session ID that are of the data of the QoS flow to the CU-CP may be understood as that when the CU-UP determines that the data of the quality of service QoS flow transmitted by using the default data radio bearer DRB arrives, the CU-UP sends the QoS flow ID and the PDU session ID that are of the data of the QoS flow to the CU-CP, to notify the CU-CP that the data of the quality of service QoS flow arrives through the default DRB.

In this embodiment of this application, when the first DRB is a dedicated DRB, that the CU-UP receives the data of the quality of service QoS flow and sends the QoS flow ID and the PDU session ID that are of the data of the QoS flow to the CU-CP may be understood as that when the CU-UP determines that the data of the quality of service QoS flow transmitted by using the dedicated data radio bearer DRB arrives, the CU-UP sends the QoS flow ID and the PDU session ID that are of the data of the QoS flow to the CU-CP, to notify the CU-CP that the data of the quality of service QoS flow arrives through the dedicated DRB.

Optionally, in an implementation of this embodiment of this application, the first information may further include a DRB identifier ID of the first DRB. In other words, the CU-UP may notify the CU-CP of the DRB ID of the first DRB. In another implementation of this application, the first information may not include the DRB ID of the first DRB. In other words, the CU-UP may not need to notify the CU-CP of the DRB ID of the first DRB, but only needs to notify the CU-CP of a QoS flow ID list in the foregoing PDU session. In this case, additional signaling overheads can be reduced.

Specifically, when sending a bearer context setup request, the CU-CP clearly indicates the QoS flow ID corresponding to the first DRB. Therefore, when the CU-UP notifies the CU-CP of only the PDU ID and the QoS flow ID in the PDU session, the CU-CP can determine the DRB corresponding to the QoS flow, namely, the first DRB. In an optional embodiment, when determining that the data of the QoS flow is transmitted by using the default DRB, the CU-CP may determine that the first DRB is the default DRB.

Optionally, the first information may include assistance information. The assistance information includes statistics about packet transmission performance on the QoS flow or the first DRB. The statistics about the packet transmission performance include, for example, at least one of a packet loss rate, a reordering waiting time, and a packet arrival rate.

Optionally, when the CU-UP receives the data of the QoS flow from the terminal device, the first information further includes an uplink indication; or when the CU-UP receives the data of the QoS flow from the core network, the first information further includes a downlink indication. Specifically, the uplink indication may be used to indicate that a transmission direction is uplink, or used to indicate that the data of the QoS flow is uplink data of the QoS flow. The downlink indication may be used to indicate that the transmission direction is downlink, or used to indicate that the data of the QoS flow is downlink data of the QoS flow. In this case, the CU-UP may separately clearly notify the CU-CP that the data of the QoS flow is uplink data or downlink data.

Alternatively, optionally, the CU-UP only notifies the CU-CP that the data of the QoS flow arrives, and does not notify the CU-CP whether the data of the QoS flow is uplink data of the QoS flow or downlink data of the QoS flow. In other words, in this case, the CU-CP and the CU-UP do not need to distinguish whether the data of the QoS flow is uplink data or downlink data.

Correspondingly, the CU-CP receives the first information.

Step 230. The CU-CP uses the first information.

Specifically, the CU-CP obtains information included in the first information, and determines, based on the information included in the first information, that the data of the QoS flow arrives. Further, the CU-CP may determine to continue to keep a mapping relationship that is between the QoS flow and the first DRB and that is included in the first information unchanged, or the CU-CP changes the first DRB corresponding to the QoS flow to a second DRB.

Specifically, the CU-CP may determine, based on a current data transmission load status and a performance parameter of the data of the QoS flow, whether to change the DRB corresponding to the QoS flow. In an example, when the first DRB is the default DRB, a priority of the default DRB is lowest. If the data of the QoS flow includes user data, the DRB corresponding to the data of the QoS flow should have a higher priority. In this case, the CU-CP considers that the default DRB cannot meet a requirement of the performance parameter of the QoS flow. In this case, the CU-CP may determine to change the default DRB corresponding to the data of the QoS flow to the second DRB. The second DRB is the dedicated DRB, and a priority of the second DRB is higher than that of the default DRB.

It should be noted that the performance parameter of the QoS flow includes a 5QI, a priority level, a packet delay budget, a packet loss rate, whether the QoS flow is delay critical, and the like.

Optionally, when the CU-CP determines to continue to keep the mapping relationship that is between the QoS flow and the first DRB and that is included in the first information unchanged, the CU-CP may not perform another operation.

Optionally, step 240. In this embodiment of this application, after the CU-CP determines to change the first DRB corresponding to the QoS flow to the second DRB, the CU-CP may send second information to the CU-UP, where the second information is used to indicate that the QoS flow corresponds to the second DRB instead of corresponding to the first DRB.

Correspondingly, the CU-UP receives the second information, and determines, based on the second information, that the QoS flow corresponds to the second DRB. Specifically, subsequently, when receiving the data of the QoS flow from the terminal device by using the second DRB, or when receiving the data of the QoS flow from the core network, the CU-UP maps the data of the QoS flow to the second DRB for transmission.

Optionally, in this embodiment of this application, after determining to change the first DRB corresponding to the QoS flow to the second DRB, the CU-CP may send the second information to a DU, so that the DU may obtain a mapping relationship between the QoS flow and the second DRB, to perform uplink and downlink scheduling on user equipment by using the second DRB.

Optionally, in this embodiment of this application, after determining to change the first DRB corresponding to the QoS flow to the second DRB, the CU-CP may send the second information to the terminal device, so that the terminal device may obtain the mapping relationship between the QoS flow and the second DRB, and the terminal device may further send the data of the QoS flow to the second DRB for transmission, or receive the data of the QoS flow from the second DRB. In an implementation, the CU-CP may send an F1-C message to the DU. An RRC message sent to the terminal device is encapsulated in the F1-C message, and the RRC message may include the second information.

In a possible implementation, when receiving the downlink QoS data flow from the second DRB, the terminal device may send, in a reflective QoS manner, the uplink data of the QoS flow to the second DRB for transmission.

Optionally, in this embodiment of this application, the second information may include a DRB ID of the second DRB and the QoS flow ID, and optionally may further include QoS parameters of the QoS flow. Herein, the QoS parameters are, for example, a 5 QI, a priority level, a packet delay budget, a packet loss rate, or whether the QoS flow is delay critical.

Optionally, in this embodiment of this application, the first DRB is the default DRB, and the second DRB is the dedicated DRB. Specifically, the second DRB is an existing dedicated DRB or a newly setup dedicated DRB.

Specifically, the CU-CP may set up the dedicated DRB by sending a signaling procedure of a UE context modification message to the CU-UP, the DU, and the UE. Specifically, for a process of setting up the dedicated DRB, refer to the prior art. Details are not described herein.

Optionally, in this embodiment of this application, the first DRB is the dedicated DRB, and the second DRB is another dedicated DRB. Specifically, the second DRB is an existing dedicated DRB or a newly setup dedicated DRB.

Optionally, the second information may include the uplink indication or the downlink indication. Specifically, for the uplink indication and the downlink indication, refer to the foregoing descriptions. To avoid repetition, details are not described herein again.

Therefore, in this embodiment of this application, in a scenario in which the CU-CP and the CU-UP are separated from each other, when receiving the data of the quality of service QoS flow, the CU-UP may send the QoS flow identity ID and the PDU session ID that are of the data of the QoS flow to the CU-CP, and the PDU session corresponding to the PDU session ID includes the data of the QoS flow. In this way, the CU-CP can determine a manner of mapping the data of the QoS flow to a radio bearer, so that a transmission performance parameter of the QoS flow is met, and user experience is improved.

Further, when the first DRB is the default DRB, when the CU-UP receives data of a QoS flow from the default DRB, the CU-UP notifies the CU-CP that the data of the QoS flow arrives, so that the CU-CP sets up a new dedicated DRB for the QoS flow, or maps the data of the QoS flow to another existing dedicated DRB, thereby implementing a remapping procedure of the QoS flow from the default DRB to the dedicated DRB.

Further, when the first DRB is the dedicated DRB, when the CU-UP receives data of a QoS flow from the dedicated DRB, the CU-UP notifies the CU-CP that the data of the QoS flow arrives, so that the CU-CP sets up a new dedicated DRB for the QoS flow, or maps the data of the QoS flow to another existing dedicated DRB, thereby implementing a remapping procedure of the QoS flow from the dedicated DRB to another dedicated DRB.

Figure 3:
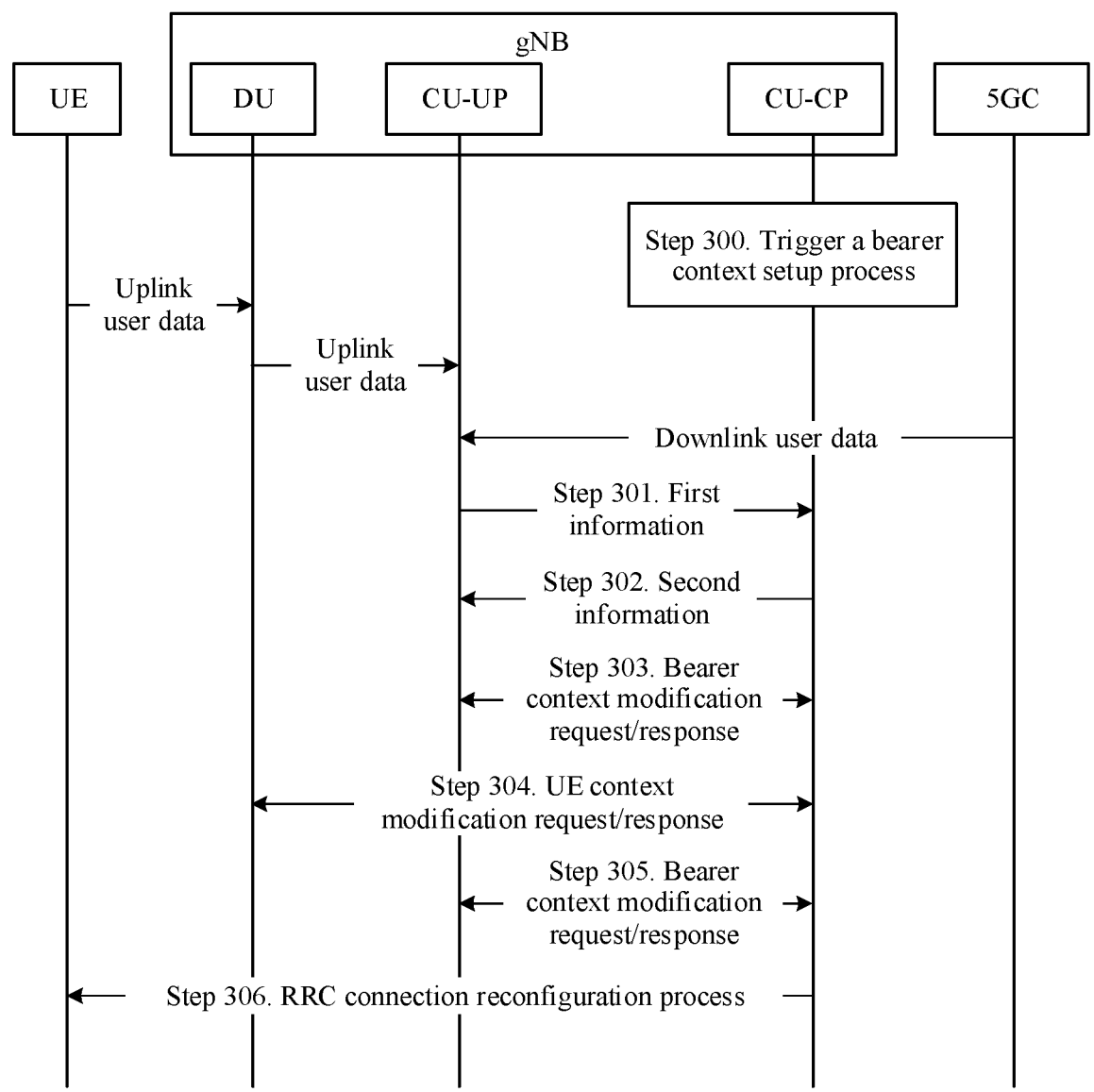
FIG. 3 is a schematic flowchart of a specific method for transmitting data of a QoS flow according to an embodiment of this application.

FIG. 3 is a schematic flowchart of a specific method for transmitting data of a QoS flow according to an embodiment of this application. It should be understood that FIG. 3 shows steps or operations of the method for transmitting data of a QoS flow. However, these steps or operations are merely examples, and other operations or variants of the operations in FIG. 3 may be further performed in this embodiment of this application. In addition, the steps in FIG. 3 may be performed in a sequence different from that shown in FIG. 3, and possibly, not all the operations in FIG. 3 need to be performed.

Step 300. A CU-UP triggers a bearer context setup process (Bearer context setup is triggered).

After setting up a bearer context, the CU-UP receives uplink user data of UE from a first DRB, or receives, from a 5G core network (5GC), downlink user data that needs to be mapped to a first DRB. Optionally, the first DRB is a default DRB.

Step 301. The CU-UP sends first information to a CU-CP, where the first information includes a QoS flow identity ID and a PDU session ID that are of data of a QoS flow that is received in step 300, and a PDU session corresponding to the PDU session ID includes the data of the QoS flow.

Optionally, the first information may further include a DRB ID of the first DRB.

In an implementation, the CU-UP may not distinguish an uplink UL direction or a downlink DL direction. In other words, the CU-UP notifies the CU-CP of the PDU session ID and the QoS flow ID that are of the received data of the QoS flow.

In another implementation, the CU-UP may distinguish the uplink UL direction and the downlink DL direction. In other words, the CU-UP notifies the CU-CP of the PDU session ID and the QoS flow ID that are of the received data of the QoS flow, and may further notify the CU-CP whether the data of the QoS flow is uplink data of the QoS flow or downlink data of the QoS flow.

In an example, the first information may be carried in a data notification message, a bearer context inactivity modification (bearer context inactivity notification) message, a bearer context modification required (bearer context modification required) message, or another E1AP message. This is not limited in this embodiment of this application.

Specifically, for the first information, refer to the description in FIG. 2. To avoid repetition, details are not described herein again.

Optionally, step 302. The CU-CP sends second information to the CU-UP, where the second information is used to indicate that the data of the QoS flow corresponds to a second DRB instead of corresponding to the first DRB. Specifically, for the second information, refer to the foregoing description. To avoid repetition, details are not described herein again.

Specifically, after receiving the first information, the CU-CP controls transmission of the data of the QoS flow by using the first information. Specifically, the CU-CP may determine to keep a mapping relationship that is between a QoS flow and a DRB and that is included in the first message unchanged, or the CU-CP determines to change the first DRB corresponding to the QoS flow to the second DRB. Herein, the second DRB may be a newly setup dedicated DRB or an existing dedicated DRB that has been set up. When determining to change the first DRB corresponding to the QoS flow to the second DRB, the CU-CP sends the second information to the CU-UP.

In an example, the CU-CP may send a bearer context modification request to the CU-UP, and the bearer context modification request includes the second information.

In an implementation, the second information may include a mapping relationship between the QoS flow and the second DRB. Specifically, the second information may include a DRB ID of the second DRB, the QoS flow ID, and QoS parameters of the QoS flow.

Optionally, step 303. The CU-UP interacts with the CU-CP to send a bearer context modification request)/bearer context modification response.

In a possible embodiment, the CU-UP may send the data notification message to the CU-CP. Optionally, the data notification message includes the first information. The CU-CP may determine whether to send the bearer context modification request to the CU-UP. Optionally, the bearer context modification request may include the second information.

In a possible embodiment, the CU-UP sends a bearer context modification required to the CU-CP. Optionally, the bearer context modification required may include the first information. Correspondingly, the CU-CP sends a bearer context modification confirm to the CU-UP. Optionally, the CU-CP may send the bearer context modification request to the CU-UP, and the bearer context modification request may include the second information. Then, the CU-UP may return the bearer context modification response to the CU-CP.

Step 304. The CU-CP sends a UE context modification request to a DU, where the UE context modification request may include the second information. Specifically, the second information may include the DRB ID of the second DRB, the QoS flow ID, or the QoS parameters of the QoS flow. Correspondingly, the DU sends a UE context modification response to the CU-CP. The UE context modification response may further include a transport network layer (TNL) address of the DU and/or a packet data convergence protocol (PDCP) status.

Step 305. The CU-CP sends the bearer context modification request to the CU-UP. The CU-UP sends the bearer context modification response to the CU-CP in response to the bearer context modification request. The bearer context modification request may include the TNL transport layer address of the DU and/or the PDCP status.

Step 306. The CU-CP sends an RRC connection reconfiguration message to the UE, where the connection reconfiguration message may include the second information, and is used by the UE to update the mapping relationship between the QoS flow and a DRB.

It should be noted that, for a QoS flow mapped to the default DRB, the CU-UP notifies the CU-CP only when a data packet that belongs to the QoS flow arrives for the first time. For a QoS flow for which the first information has been sent, the CU-UP does not inform the CU-CP that data of the QoS flow subsequently arrives. When the QoS flow subsequently arrives, the CU-UP maps the QoS flow to the second DRB based on a mapping relationship between the second DRB, and a QoS flow ID that is of the QoS flow and that is sent by the CU-CP.

Therefore, in this embodiment of this application, in a scenario in which the CU-CP and the CU-UP are separated from each other, when receiving the data of the quality of service QoS flow, the CU-UP may send the QoS flow identity ID and the PDU session ID that are of the data of the QoS flow to the CU-CP, and the PDU session corresponding to the PDU session ID includes the data of the QoS flow. In this way, the CU-CP can control transmission of the data of the QoS flow, so that a performance parameter of the QoS flow is met, and user experience is improved.

Further, when the first DRB is the default DRB, when the CU-UP receives data of a QoS flow from the default DRB, the CU-UP notifies the CU-CP that the data of the QoS flow arrives, so that the CU-CP sets up a new dedicated DRB for the QoS flow, or maps the data of the QoS flow to another existing dedicated DRB, thereby implementing a remapping procedure of the QoS flow from the default DRB to the dedicated DRB.

Further, when the first DRB is the dedicated DRB, when the CU-UP receives data of a QoS flow from the dedicated DRB, the CU-UP notifies the CU-CP that the data of the QoS flow arrives, so that the CU-CP sets up a new dedicated DRB for the QoS flow, or maps the data of the QoS flow to another existing dedicated DRB, thereby implementing a remapping procedure of the QoS flow from the dedicated DRB to another dedicated DRB.

Figure 4:
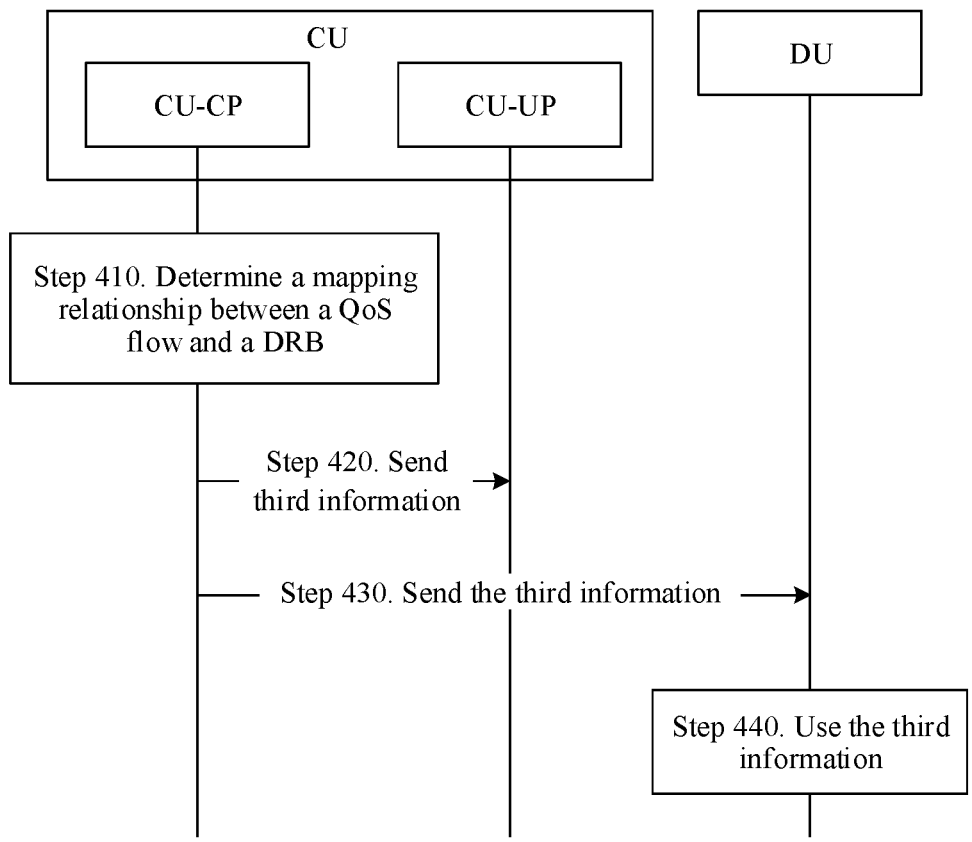
FIG. 4 is a schematic flowchart of a data transmission method according to an embodiment of this application.
Figure 5:
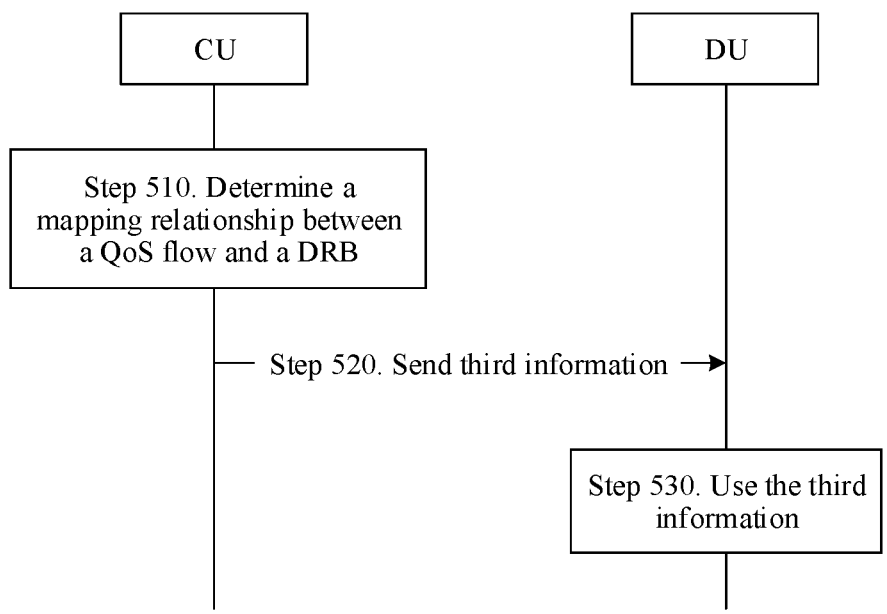
FIG. 5 is a schematic flowchart of a data transmission method according to an embodiment of this application.

FIG. 4 and FIG. 5 are each a schematic flowchart of a data transmission method according to an embodiment of this application. In FIG. 4, in a scenario in which a CU-CP and a CU-UP are separated from each other, the CU-CP may determine an asymmetric mapping relationship between a QoS flow and a DRB, and then notify the CU-UP and a DU of the asymmetric mapping relationship. In FIG. 5, in a scenario in which a CU and a DU are separated from each other, the CU determines an asymmetric mapping relationship between a QoS flow and a DRB, and then notifies the DU of the asymmetric mapping relationship. Specifically, for the CU, the CU-CP, the CU-UP, and the DU in FIG. 4, and the CU and the DU in FIG. 5, refer to the descriptions in FIG. 1. To avoid repetition, details are not described herein again.

Specifically, the data transmission method in FIG. 4 includes steps 410 to 440. It should be understood that FIG. 4 shows steps or operations of the data transmission method. However, these steps or operations are merely examples, and other operations or variants of the operations in FIG. 4 may be further performed in this embodiment of this application. In addition, the steps in FIG. 4 may be performed in a sequence different from that shown in FIG. 4, and possibly, not all the operations in FIG. 4 need to be performed.

Step 410. The CU-CP determines a mapping relationship between a quality of service QoS flow and a DRB, where the mapping relationship includes at least one of the following: a mapping relationship between an uplink QoS flow and the DRB, a mapping relationship between a downlink QoS flow and the DRB, or a mapping relationship between a bidirectional QoS flow and the DRB.

Specifically, the mapping relationship between an uplink QoS flow and the DRB is a mapping relationship between uplink transmission data of a QoS flow and a DRB on which the uplink data of the QoS flow is transmitted; the mapping relationship between a downlink QoS flow and the DRB is a mapping relationship between downlink transmission data of a QoS flow and a DRB on which the downlink data of the QoS flow is transmitted; and the mapping relationship between a bidirectional QoS flow and the DRB is a mapping relationship between data of a QoS flow and a DRB on which the data of the QoS flow is transmitted. The data of the QoS flow includes uplink data, and also includes downlink data.

It can be learned that when the mapping relationship includes the mapping relationship between an uplink QoS flow and the DRB, and/or the mapping relationship between a downlink QoS flow and the DRB, the mapping relationship between a QoS flow and a DRB is asymmetric. In other words, in this embodiment of this application, the mapping relationship between an uplink QoS flow and the DRB is decoupled from the mapping relationship between a downlink QoS flow and the DRB, and the mapping relationship between an uplink QoS flow and the DRB may be the same as or different from the mapping relationship between a downlink QoS flow and the DRB. This is not limited in this embodiment of this application. For example, an uplink QoS flow ID #1 may be mapped to a DRB #1, and a downlink QoS flow ID #1 may be mapped to a DRB #2.

In this embodiment of this application, when the mapping relationship includes the mapping relationship between a bidirectional QoS flow and a DRB, the mapping relationship between a QoS flow and a DRB is symmetric. In other words, in this case, the mapping relationship between an uplink QoS flow and the DRB is the same as the mapping relationship between a downlink QoS flow and the DRB. For example, a QoS flow ID #1 may be mapped to the DRB #1. In this case, it means that both the uplink QoS flow ID #1 and the downlink QoS flow ID #1 are mapped to the DRB #1.

Step 420. The CU-CP sends third information to the CU-UP, where the third information includes the mapping relationship between a QoS flow and a DRB in step 410.

Optionally, in this embodiment of this application, the third information may further include a mapping indication, used to indicate whether data that is in the QoS flow and that is mapped to the DRB is uplink data or downlink data (indication whether the UL data or DL data of one QoS flow map to this DRB), or indicate that that is in the QoS flow and that is mapped to the DRB is uplink data and downlink data.

Optionally, in this embodiment of this application, the third information may further include an asymmetric mapping indication, used to indicate whether data that is in the QoS flow and that is mapped to the DRB is uplink data or downlink data (indication whether the UL data or DL data of one QoS flow map to this DRB).

Specifically, when the mapping relationship includes the mapping relationship between an uplink QoS flow and the DRB, the asymmetric mapping indication is used to indicate that the mapping relationship is the mapping relationship between an uplink QoS flow and a DRB. In this case, the asymmetric mapping indication may also be referred to as an uplink indication. When the mapping relationship includes the mapping relationship between a downlink QoS flow and the DRB, the asymmetric mapping indication is used to indicate that the mapping relationship is the mapping relationship between a downlink QoS flow and the DRB. In this case, the asymmetric mapping indication may also be referred to as a downlink indication. When the mapping relationship includes the mapping relationship between a bidirectional QoS flow and the DRB, the asymmetric mapping indication is used to indicate that the mapping relationship is the mapping relationship between a bidirectional QoS flow and the DRB. In this case, the asymmetric mapping indication may also be referred to as a bidirectional indication. In this way, the CU-CP may explicitly indicate to the CU-UP whether the QoS flow in the mapping relationship is an uplink QoS flow, a downlink QoS flow, or a bidirectional QoS flow.

In an example, the third information may be in a format shown in the following Table 1.

TABLE 1

| DRB modification list (DRB to Be Modified Item IEs) | 1. < Maximum quantity of DRBs> |
|---|---|
| > DRB ID | |
| >> QFI | |
| >> QFI direction | For example, uplink, downlink, and bidirectional. |
| >>>> QoS parameters of a QoS flow | |

The QFI indicates a QoS flow ID. Specifically, the DRB ID, the QFI, the QFI direction, and the QoS parameters may be filled in Table 1 based on a specific scenario. The QFI direction herein may be specifically the foregoing asymmetric mapping indication.

Optionally, in this embodiment of this application, the CU-CP may alternatively implicitly indicate to the CU-UP whether the QoS flow in the mapping relationship is an uplink QoS flow, a downlink QoS flow, or a bidirectional QoS flow. In an example, the third information may include a guaranteed flow bit rate GFBR or a maximum flow bit rate MFBR of the QoS flow #1. Specifically, if an uplink guaranteed flow bit rate GFBR or an uplink maximum flow bit rate MFBR of the QoS flow #1 is greater than zero, and a downlink GFBR or a downlink MFBR is equal to zero, the QoS flow #1 is an uplink QoS flow; if the downlink GFBR or the downlink MFBR of the QoS flow #1 is greater than zero, and the uplink GFBR or the uplink MFBR is equal to zero, the QoS flow #1 is a downlink QoS flow; and if the downlink GFBR or the downlink MFBR of the QoS flow #1 is greater than zero, and the uplink GFBR or the uplink MFBR is greater than zero, the QoS flow #1 is a bidirectional QoS flow.

In a specific implementation, the CU-CP may send a bearer context setup request or a bearer context modification request to the CU-UP, where the bearer context setup request or the bearer context modification request may include the third information.

Correspondingly, the CU-UP may receive the third information from the CU-CP, and use the third information.

Specifically, after receiving the third information, the CU-UP records the mapping relationship indicated by the third information. When receiving downlink data of a QoS flow sent by a core network, the CU-UP may map, based on a mapping relationship that is between a downlink QoS flow ID and a DRB and that is indicated by the third information, the downlink data of the QoS flow to a corresponding DRB to transmit the downlink data of the QoS flow to the DU.

When receiving uplink data of a QoS flow sent by a terminal device, the CU-UP may verify, based on a mapping relationship that is between an uplink QoS flow ID and a DRB and that is indicated by the third information, whether the uplink data of the QoS flow is transmitted on a corresponding DRB.

In addition, if the CU-CP subsequently performs a remapping operation on the uplink data of the QoS flow indicated by the third information, for example, when the uplink QoS flow is remapped from the DRB #1 to a DRB #3, the CU-UP waits to receive an end marker data packet of the uplink data of the QoS flow from the DRB #1, to determine that the last data packet of the uplink data of the QoS flow is received from the DRB #1. In addition, the CU-UP receives the uplink data of the QoS flow from the DRB #3. Then, the CU-UP sends all the uplink data of the QoS flow to the core network.

Step 430. The CU-CP sends the third information to the DU, where the third information includes the mapping relationship between a QoS flow and a DRB in step 410.

In a possible implementation, the CU-CP may send a user equipment UE bearer context setup request or a UE context modification request to the DU, where the UE context setup request or the UE context modification request includes the third information.

Specifically, for the third information, refer to the description in step 420. To avoid repetition, details are not described herein again.

Correspondingly, the DU receives the third information.

Step 440. The DU uses the third information.

Specifically, after receiving the third information, the DU records the mapping relationship indicated by the third information. Configuration parameters of media access control (MAC) layers and radio link control (RLC) layers of DRBs that correspond to an uplink QoS flow and a downlink QoS flow and that are indicated by the third information are separately determined, and configuration parameters of a media access control layer and a radio link control layer of a DRB that corresponds to an uplink QoS flow or a downlink QoS flow and that is indicated by the third information are separately determined. In a possible implementation, the DU separately performs uplink scheduling and downlink scheduling at the MAC layer based on the QoS flow in the DRB.

Therefore, in this embodiment of this application, the CU-CP determines an asymmetric mapping relationship between a QoS flow and a DRB, and notifies the CU-UP and the DU of the asymmetric mapping relationship, thereby implementing flexible uplink QoS flow mapping and downlink QoS flow mapping, and decoupling the mapping relationship between an uplink QoS flow and the DRB from the mapping relationship between a downlink QoS flow and the DRB. In this way, requirements for uplink transmission and downlink transmission of a QoS flow can be separately guaranteed (a guaranteed bit rate of uplink transmission of the QoS flow is different from a guaranteed bit rate of downlink transmission of the QoS flow, and a maximum bit rate of uplink transmission of the QoS flow is different from a maximum bit rate of downlink transmission of the QoS flow). In addition, a network may flexibly configure uplink mapping and downlink mapping of the QoS flow based on uplink/downlink network load, an uplink/downlink interference status, an uplink/downlink QoS flow parameter feature, and the like, thereby further improving user experience.

Specifically, the data transmission method in FIG. 5 includes steps 510 to 530. It should be understood that FIG. 5 shows steps or operations of the data transmission method. However, these steps or operations are merely examples, and other operations or variants of the operations in FIG. 5 may be further performed in this embodiment of this application. In addition, the steps in FIG. 5 may be performed in a sequence different from that shown in FIG. 5, and possibly, not all the operations in FIG. 5 need to be performed.

Step 510. A CU determines a mapping relationship between a quality of service QoS flow and a DRB, where the mapping relationship includes at least one of the following: a mapping relationship between an uplink QoS flow and the DRB, a mapping relationship between a downlink QoS flow and the DRB, or a mapping relationship between a bidirectional QoS flow and the DRB.

Specifically, for the mapping relationship between a QoS flow and a DRB, refer to the description of step 410 in FIG. 4. To avoid repetition, details are not described herein again.

Step 520. The CU sends third information to a DU, where the third information includes the mapping relationship between a QoS flow and a DRB in step 410. Correspondingly, the DU receives the third information from the CU. Specifically, for the third information, refer to the description of steps 420 and 430 in FIG. 4. To avoid repetition, details are not described herein again.

Step 530. The DU uses the third information.

Specifically, for step 530, refer to the description of step 440 in FIG. 4. To avoid repetition, details are not described herein again.

Therefore, in this embodiment of this application, the CU determines an asymmetric mapping relationship between a QoS flow and a DRB, and notifies the DU of the asymmetric mapping relationship, thereby implementing flexible uplink QoS flow mapping and downlink QoS flow mapping, and decoupling the mapping relationship between an uplink QoS flow and the DRB from the mapping relationship between a downlink QoS flow and the DRB. In this way, requirements for uplink transmission and downlink transmission of a QoS flow can be separately guaranteed (a guaranteed bit rate of uplink transmission of the QoS flow is different from a guaranteed bit rate of downlink transmission of the QoS flow, and a maximum bit rate of uplink transmission of the QoS flow is different from a maximum bit rate of downlink transmission of the QoS flow). In addition, a network may flexibly configure uplink mapping and downlink mapping of the QoS flow based on uplink/downlink network load, an uplink/downlink interference status, an uplink/downlink QoS flow parameter feature, and the like, thereby further improving user experience.

Figure 6:
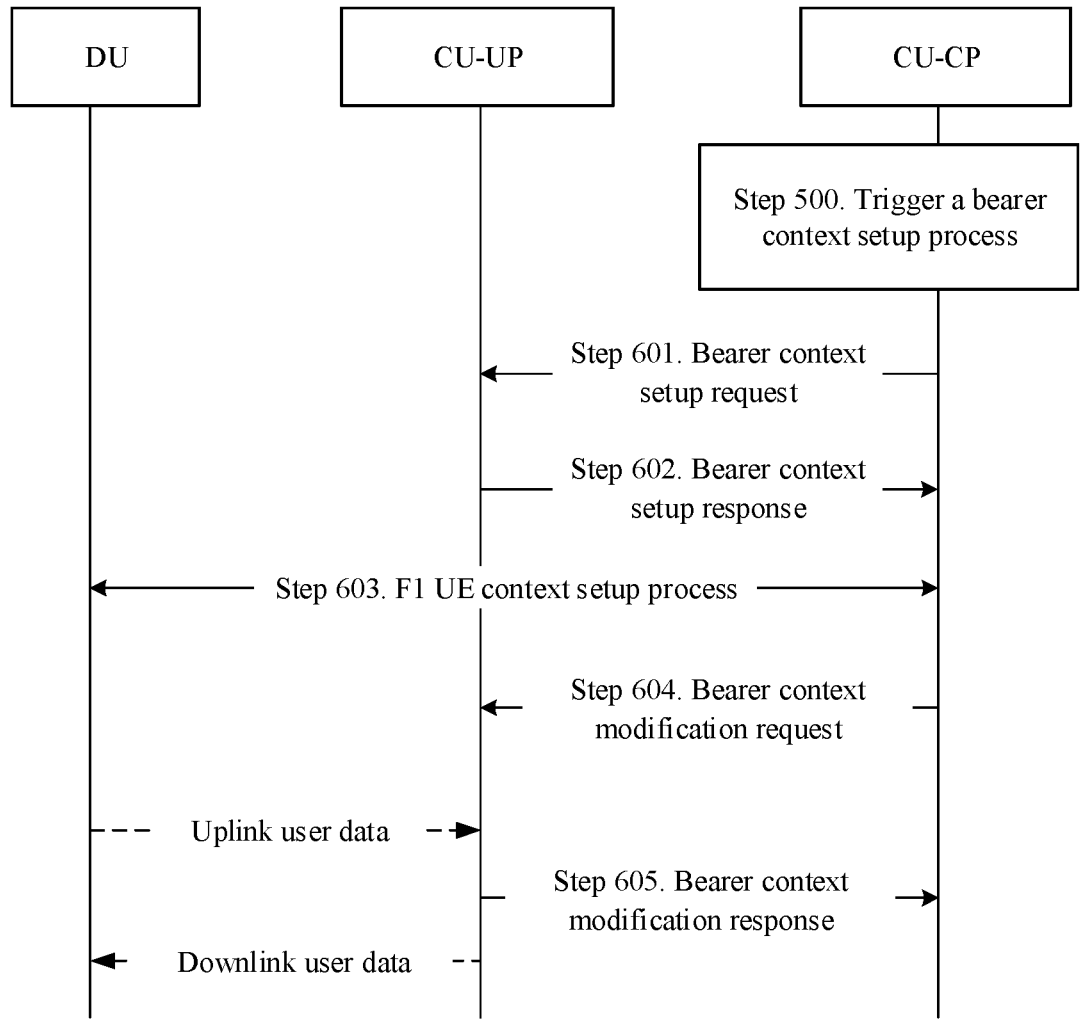
FIG. 6 is a schematic flowchart of a specific method for transmitting data of a QoS flow according to an embodiment of this application.

FIG. 6 is a schematic flowchart of a specific method for transmitting data of a QoS flow according to an embodiment of this application. It should be understood that FIG. 6 shows steps or operations of the method for transmitting data of a QoS flow. However, these steps or operations are merely examples, and other operations or variants of the operations in FIG. 6 may be further performed in this embodiment of this application. In addition, the steps in FIG. 6 may be performed in a sequence different from that shown in FIG. 6, and possibly, not all the operations in FIG. 6 need to be performed. Herein, for a CU-CP, a CU-UP, and a DU, refer to the descriptions in FIG. 1. To avoid repetition, details are not described herein again.

Step 600. The CU-CP determines to trigger a bearer context process (bearer context setup is triggered).

Step 601. The CU-CP sends a bearer context setup request to the CU-CP, where the bearer context setup request includes third information.

Step 602. The CU-UP sends a bearer context setup response to the CU-CP in response to the bearer context setup request.

Step 603. The CU-CP performs a UE context setup process with the DU. Specifically, the CU-CP sends a UE context setup request to the DU, where the UE context setup request includes the third information. The DU may send a context setup response to the CU-UP in response to the UE context setup request. Specifically, the CU-CP communicates with the DU through an F1-C interface.

Step 604. The CU-CP sends a bearer context modification request to the CU-UP.

Step 605. The CU-UP sends a bearer context modification response to the CU-CP in response to the bearer context modification request sent by the CU-CP.

Therefore, in this embodiment of this application, the CU-CP determines an asymmetric mapping relationship between a QoS flow and a DRB, and then notifies the CU-UP and the DU of the asymmetric mapping relationship, thereby implementing flexible uplink QoS flow mapping and downlink QoS flow mapping, and decoupling a mapping relationship between an uplink QoS flow and the DRB from a mapping relationship between a downlink QoS flow and the DRB. In this way, requirements for uplink transmission and downlink transmission of a QoS flow can be separately guaranteed (a guaranteed bit rate of uplink transmission of the QoS flow is different from a guaranteed bit rate of downlink transmission of the QoS flow, and a maximum bit rate of uplink transmission of the QoS flow is different from a maximum bit rate of downlink transmission of the QoS flow). In addition, a network may flexibly configure uplink mapping and downlink mapping of the QoS flow based on uplink/downlink network load, an uplink/downlink interference status, an uplink/downlink QoS flow parameter feature, and the like, thereby further improving user experience.

Figure 7:
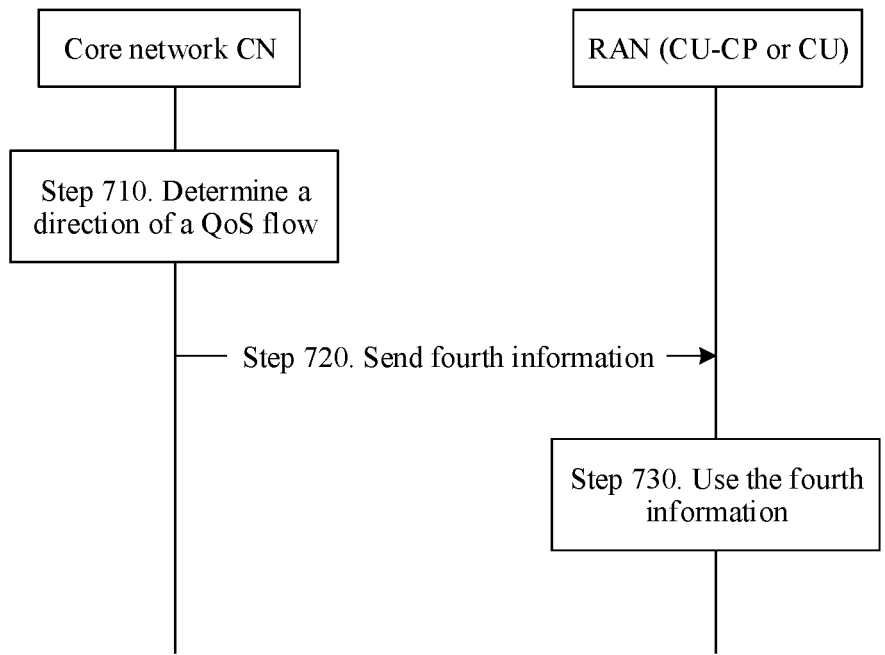
FIG. 7 is a schematic flowchart of a data transmission method according to an embodiment of this application.

FIG. 7 is a schematic flowchart of a data transmission method according to an embodiment of this application; In FIG. 7, an access network device may independently configure uplink transmission and downlink transmission of a QoS flow based on a direction of the QoS flow. Specifically, for a CU and a CU-CP in FIG. 7, refer to the descriptions in FIG. 1. To avoid repetition, details are not described herein again.

Step 710. A core network CN determines the direction of the QoS flow.

Specifically, in this embodiment of this application, there may be some QoS flows that have only a unidirectional characteristic, that is, the QoS flows are only uplink QoS flows, or are only downlink QoS flows. Alternatively, there may be some QoS flows that have a bidirectional characteristic, that is, the QoS flows may be uplink QoS flows and may also be uplink QoS flows. In this embodiment of this application, the core network CN, for example, an access and mobility management function (AMF) network element in the core network, may determine a directional characteristic of the QoS flow.

Step 720. The core network sends fourth information to a RAN.

Specifically, the core network may notify the radio access network RAN (for example, the CU-CP or the CU) of a directional characteristic of a QoS flow by using the fourth information. For example, the QoS flow is an uplink QoS flow, a downlink QoS flow, or a bidirectional QoS flow.

In a possible implementation, the fourth information includes a PDU session ID, a QoS flow ID, and a directional characteristic of a QoS flow corresponding to the QoS flow ID. Herein, the directional characteristic is, for example, uplink, downlink, or bidirectional.

In addition, when the QoS flow is an uplink QoS flow, the fourth information may further include an uplink QoS parameter of the QoS flow, where the uplink QoS parameter is a QoS parameter configured for the QoS flow during uplink transmission. When the QoS flow is a downlink QoS flow, the fourth information may further include a downlink QoS parameter of the QoS flow, where the downlink QoS parameter is a QoS parameter configured for the QoS flow during downlink transmission. When the QoS flow is a bidirectional QoS flow, the fourth information may further include a UL QoS parameter and a DL QoS parameter of the QoS flow.

In an example, the fourth information may be in a format shown in the following Table 2.

TABLE 2

| PDU session resource setup request list | 1. < Maximum quantity of DRBs> |
|---|---|
| > Session ID | |
| >> QFI | |
| >> QFI direction | For example, uplink, downlink, and bidirectional. |
| >> QoS parameters of a QoS flow | |

The QFI indicates a QoS flow ID, and the session ID indicates a PDU session ID. Specifically, the session ID, the QFI, the QFI direction, and the QoS parameters may be filled in Table 2 based on a specific scenario.

In a possible implementation, the AMF may send a PDU session resource setup request to the RAN, where the PDU session resource setup request may include the fourth information. The RAN may send a PDU session resource setup response to the AFM in response to the PDU session resource setup request.

Correspondingly, the RAN receives the fourth information.

Step 730. The RAN uses the fourth information.

Specifically, the RAN obtains information included in the fourth information, and determines the directional characteristic of the QoS flow based on the information included in the fourth information. In addition, in a scenario in which the CU-CP and a CU-UP are separated from each other, after the CU-CP determines the directional characteristic of the QoS flow, the CU-CP may separately notify the CU-UP and the DU of the directional characteristic of the QoS flow.

Therefore, in this embodiment of this application, the access network device may independently configure uplink transmission and downlink transmission of the QoS flow based on the determined direction of the QoS flow. Specifically, if the QoS flow is only an uplink QoS flow, the access network device determines a scheduling policy of an uplink data packet of the QoS flow, and does not need to consider downlink transmission. If the QoS flow is only a downlink QoS flow, the access network device determines a scheduling policy of a downlink data packet of the QoS flow, and does not need to consider uplink transmission. Therefore, in this embodiment of this application, a particular requirement of the QoS flow can be met.

The foregoing describes the solutions provided in the embodiments of this application mainly from the perspective of interaction between different devices with reference to FIG. 2 to FIG. 7. Devices for performing the solutions provided in the embodiments of this application are described below with reference to FIG. 8 and FIG. 9. It may be understood that, to implement the foregoing functions, a CU, a CU-CP, a CU-UP, a DU, and a CN include corresponding hardware structures and/or software modules for performing the functions. With reference to units and algorithm steps described in the embodiments disclosed in this application, the embodiments of this application can be implemented in a form of hardware or a combination of hardware and computer software. Whether a function is performed by the hardware or the hardware driven by the computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, the CU, the CU-CP, the CU-UP, the DU, the CN, or the like may be divided into functional units based on the foregoing method examples. For example, the functional units may be obtained through division based on corresponding functions, or two or more functions may be integrated into one processing unit. The integrated unit may be implemented in a form of hardware, or may be implemented in a form of a software functional unit. It should be noted that, in this embodiment of this application, unit division is an example, and is merely a logical function division. In actual implementation, another division manner may be used.

Figure 8:
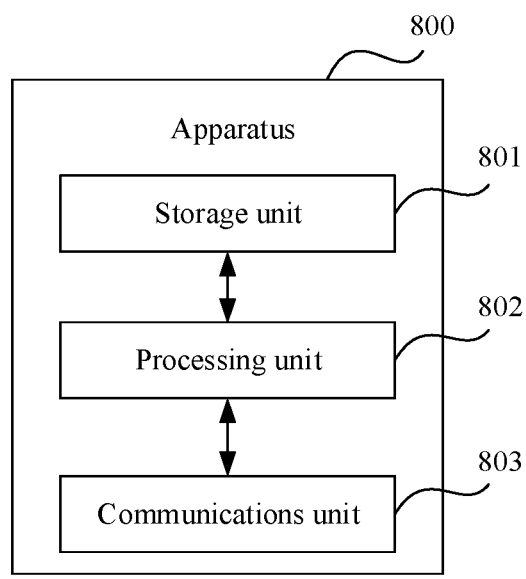
FIG. 8 is a schematic block diagram of a communications apparatus according to an embodiment of this application.

When the integrated unit is used, FIG. 8 is a possible example block diagram of a communications apparatus according to an embodiment of this application. The apparatus 800 may exist in a form of software, hardware, or a combination of software and hardware. FIG. 8 is a possible schematic block diagram of an apparatus according to an embodiment of this application. The apparatus 800 includes a processing unit 802 and a communications unit 803. The processing unit 802 is configured to control and manage an action of the apparatus. The communications unit 803 is configured to support communication between the apparatus and another device. The apparatus may further include a storage unit 801, configured to store program code and data of the apparatus.

The apparatus 800 shown in FIG. 8 may be the CU, the CU-CP, the CU-UP, the DU, or the CN in the embodiments of this application.

When the apparatus 800 shown in FIG. 8 is the CU, the processing unit 802 can support the apparatus 800 in performing the actions completed by the CU in the foregoing method examples. For example, the processing unit 802 supports the apparatus 800 in performing, for example, step 510 in FIG. 5 and step 730 in FIG. 7, and/or is configured to perform another process in the technology described in this specification. The communications unit 803 can support communication between the apparatus 800 and the DU, the CN, and the like. For example, the communications unit 803 supports the apparatus 800 in performing step 520 in FIG. 5, step 720 in FIG. 7, and/or another related communication process.

When the apparatus 800 shown in FIG. 8 is the CU-CP, the processing unit 802 can support the apparatus 800 in performing the actions completed by the CU-CP in the foregoing method examples. For example, the processing unit 802 supports the apparatus 800 in performing, for example, step 230 in FIG. 2, step 300 in FIG. 3, step 410 in FIG. 4, step 500 in FIG. 6, and step 730 in FIG. 7, and/or is configured to perform another process in the technology described in this specification. The communications unit 803 can support communication between the apparatus 800 and the CU-UP, the DU, the CN, and the like. For example, the communications unit 803 supports the apparatus 800 in performing steps 220 and 240 in FIG. 2, steps 301 to 306 in FIG. 3, steps 420 and 430 in FIG. 4, steps 601 to 605 in FIG. 6, step 720 in FIG. 7, and/or another related communication process.

When the apparatus 800 shown in FIG. 8 is the CU-UP, the processing unit 802 can support the apparatus 800 in performing the actions completed by the CU-UP in the foregoing method examples. For example, the processing unit 802 supports the apparatus 800 in performing, for example, step 210 in FIG. 2, and/or is configured to perform another process in the technology described in this specification. The communications unit 803 can support communication between the apparatus 800 and the CU-UP, the DU, the CN, and the like. For example, the communications unit 803 supports the apparatus 800 in performing steps 220 and 240 in FIG. 2, steps 301 to 303 and step 305 in FIG. 3, step 420 in FIG. 4, steps 601, 602, 604, and 605 in FIG. 6, and/or another related communication process.

When the apparatus 800 shown in FIG. 8 is the CU-UP, the processing unit 802 can support the apparatus 800 in performing the actions completed by the CU-UP in the foregoing method examples. For example, the processing unit 802 supports the apparatus 800 in performing, for example, step 210 in FIG. 2, and/or is configured to perform another process in the technology described in this specification. The communications unit 803 can support communication between the apparatus 800 and the CU-UP, the DU, the CN, and the like. For example, the communications unit 803 supports the apparatus 800 in performing steps 220 and 240 in FIG. 2, steps 301 to 303 and step 305 in FIG. 3, step 420 in FIG. 4, steps 601, 602, 604, and 605 in FIG. 6, and/or another related communication process.

When the apparatus 800 shown in FIG. 8 is the DU, the processing unit 802 can support the apparatus 800 in performing the actions completed by the DU in the foregoing method examples. For example, the processing unit 802 supports the apparatus 800 in performing, for example, step 440 in FIG. 4 and step 530 in FIG. 5, and/or is configured to perform another process in the technology described in this specification. The communications unit 803 can support communication between the apparatus 800 and the CU-CP, the CU-UP, the CN, a terminal device, and the like. For example, the communications unit 803 supports the apparatus 800 in performing step 304 in FIG. 3, step 430 in FIG. 4, step 520 in FIG. 5, step 603 in FIG. 6, and/or another related communication process.

When the apparatus 800 shown in FIG. 8 is the CN, the processing unit 802 can support the apparatus 800 in performing the actions completed by the CN in the foregoing method examples. For example, the processing unit 802 supports the apparatus 800 in performing, for example, step 710 in FIG. 7, and/or is configured to perform another process in the technology described in this specification. The communications unit 803 can support communication between the apparatus 800 and the CU-CP, the CU, and the like. For example, the communications unit 803 supports the apparatus 800 in performing step 720 in FIG. 7, and/or another related communication process.

For example, the processing unit 802 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor/controller may implement or execute various example logical blocks, units, and circuits described with reference to content disclosed in this application. The processor may be a combination of processors implementing a computing function, for example, a combination of one or more microprocessors, or a combination of the DSP and a microprocessor. The communications unit 803 may be a communications interface, and the communications interface is a general term. In specific implementation, the communications interface may include one or more interfaces. The storage unit 801 may be a memory.

Figure 9:
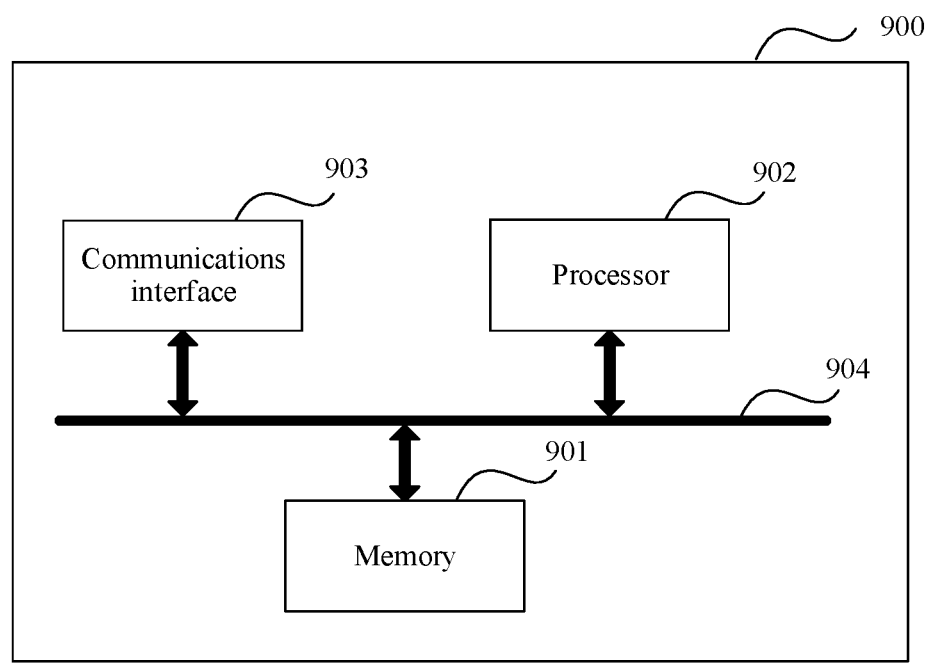
FIG. 9 is a schematic block diagram of another communications apparatus according to an embodiment of this application.

When the processing unit 802 is a processor, the communications unit 803 is a communications interface, and the storage unit 801 is a memory, the apparatus 800 in this embodiment of this application may be a communications apparatus 900 shown in FIG. 9.

Referring to FIG. 9, the apparatus 900 includes a processor 902 and a communications interface 903. Further, the apparatus 900 may further include a memory 901. Optionally, the apparatus 900 may further include a bus 904. The communications interface 903, the processor 902, and the memory 901 may be connected to each other by using the bus 904. The bus 904 may be a peripheral component interconnect (PCI) bus, an extended industry standard architecture (EISA) bus, or the like. The bus 904 may be classified into an address bus, a data bus, a control bus, and the like. For ease of representation, only one thick line is used to represent the bus in FIG. 9, but this does not mean that there is only one bus or only one type of bus.

The processor 902 may perform various functions of the apparatus 900 by running or performing a program stored in the memory 901.

For example, the communications apparatus 900 shown in FIG. 9 may be the CU, the CU-CP, the CU-UP, the DU, or the CN in the embodiments of this application.

When the apparatus 900 is the CU, the processor 902 may perform the actions completed by the CU in the foregoing method examples by running or performing the program stored in the memory 901. When the apparatus 900 is the CU-CP, the processor 902 may perform the actions completed by the CU-CP in the foregoing method examples by running or performing the program stored in the memory 901. When the apparatus 900 is the CU-UP, the processor 902 may perform the actions completed by the CU-UP in the foregoing method examples by running or performing the program stored in the memory 901. When the apparatus 900 is the DU, the processor 902 may perform the actions completed by the DU in the foregoing method examples by running or performing the program stored in the memory 901. When the apparatus 900 is the CN, the processor 902 may perform the actions completed by the CN in the foregoing method examples by running or performing the program stored in the memory 901.

In another form of this embodiment, a computer-readable storage medium is provided. The computer-readable storage medium stores an instruction. When the instruction is executed, the method in the foregoing method embodiments is performed.

In another form of this embodiment, a computer program product that includes an instruction is provided. When the instruction is executed, the method in the foregoing method embodiments is performed.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be in a singular or plural form. The character "/" generally indicates an "or" relationship between the associated objects. "At least one of the following (pieces)" or a similar expression thereof refers to any combination of these items, and includes a single item (piece) or any combination of a plurality of items (pieces). For example, at least one (one piece) of a, b, or c may represent: a, b, c, a-b, a-c, b-c, or a-b-c. There may be one single piece of a, b, or c, or there may be a plurality of pieces of a, b, or c.

It should be understood that "one embodiment" or "an embodiment" mentioned in the whole specification means that particular features, structures, or characteristics related to the embodiment are included in at least one embodiment of the present invention. Therefore, "in one embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that first, second, and various numerical symbols are for distinguishing only for ease of description, and are not used to limit the scope of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A data transmission method, comprising:
   receiving, by a central unit-user plane (CU-UP) of a radio access network (RAN), data of a quality of service (QoS) flow through a default data radio bearer (DRB); and
   sending, by the CU-UP to a central unit-control plane (CU-CP) of the RAN, a data notification message notifying the CU-CP that a data packet of the QoS flow is received for a first time through the default DRB, wherein the data notification message comprises a QoS flow identity (ID) of the QoS flow and a protocol data unit (PDU) session ID identifying a PDU session, wherein the PDU session comprises the data of the QoS flow.

2. The method according to claim 1, further comprising:
receiving, by the CU-UP, information from the CU-CP, wherein the information is used to indicate that the data of the QoS flow corresponds to a dedicated DRB instead of corresponding to the default DRB.

3. The method according to claim 2, wherein the data packet of the QoS flow is not configured by a radio resource control (RRC) configuration with a mapping relationship between the QoS flow and a DRB, and is not configured with a reflective QoS indicating the mapping relationship between the QoS flow and the DRB.

4. The method according to claim 1, wherein receiving, by the CU-UP, the data of the QoS flow through the default DRB comprises:
receiving, by the CU-UP for the first time through the default DRB, the data packet that belongs to the QoS flow and is not configured by a mapping relationship between the QoS flow and a DRB.

5. The method according to claim 1, wherein the method further comprises:
sending, by the CU-UP to a distributed unit (DU) of the RAN, a mapping relationship between an uplink QoS flow and a first DRB or a mapping relationship between a downlink QoS flow and a second DRB.

6. The method according to claim 5, wherein the mapping relationship between the uplink QoS flow and the first DRB comprises a DRB ID, a QoS flow ID (QFI), and an uplink indication.

7. The method according to claim 5, wherein the mapping relationship between the downlink QoS flow and the second DRB comprises a DRB ID, a QoS flow ID (QFI), and a downlink indication.

8. The method according to claim 1, wherein the method further comprises:
keeping a mapping relationship between the QoS flow and the default DRB; or
mapping the QoS flow to a dedicated DRB.

9. A data transmission method, wherein the method, comprising:
receiving, by a central unit-control plane (CU-CP) of a radio access network (RAN), a data notification message from a central unit-user plane (CU-UP) of the RAN, wherein the data notification message notifies the CU-CP that a data packet of a quality of service (QoS) flow is received for a first time through a default data radio bearer (DRB) and comprises a QoS flow identity (ID) of the QoS flow and a protocol data unit (PDU) session ID identifying a PDU session wherein the PDU session comprises the data of the QoS flow; and
using, by the CU-CP, the data notification message.

10. The method according to claim 9, further comprising:
sending, by the CU-CP, information to the CU-UP, wherein the information is used to indicate that data of the QoS flow corresponds to a dedicated DRB instead of corresponding to the default DRB.

11. The method according to claim 10, wherein the data packet of the QoS flow is not configured by a mapping relationship between the QoS flow and a DRB, and is not configured with a reflective QoS indicating the mapping relationship between the QoS flow and the DRB.

12. A communications apparatus, comprising:
at least one processor; and
one or more memories coupled to the at least one processor and storing programming instructions for execution by the at least one processor to perform operations comprising:
receiving data of a quality of service (QoS) flow through a default data radio bearer (DRB); and
sending a data notification message from a central unit-user plane (CU-UP) of a radio access network (RAN) to a central unit-control plane (CU-CP) of the RAN, wherein the data notification message notifies the CU-CP that a data packet of the QoS flow is received for a first time through the default DRB and comprises a QoS flow identity (ID) of the QoS flow and a protocol data unit (PDU) session ID identifying a PDU session, wherein the PDU session comprises the data of the QoS flow.

13. The apparatus according to claim 12, wherein the communication apparatus is the CU-CP of the RAN.

14. The apparatus according to claim 13, the operations further comprising:
receiving information from the CU-CP, wherein the information is used to indicate that data of the QoS flow corresponds to a dedicated DRB instead of corresponding to the default DRB.

15. The apparatus according to claim 14, wherein the data packet is not configured by a radio resource control (RRC) configuration with a mapping relationship between the QoS flow and a DRB, and is not configured with a reflective QoS indicating the mapping relationship between the QoS flow and the DRB.

16. The apparatus according to claim 12, the operations further comprising:
keeping a mapping relationship between the QoS flow and the default DRB; or
mapping the QoS flow to a dedicated DRB.

17. A communications apparatus, comprising:
at least one processor; and
one or more memories coupled to the at least one processor and storing programming instructions for execution by the at least one processor to perform operations comprising:
receiving a data notification message from a central unit-user plane (CU-UP) of a radio access network (RAN), wherein the data notification message notifies a central unit-control plane (CU-CP) of the RAN that a data packet of a quality of service (QoS) flow is received for a first time through a default data radio bearer (DRB) and comprises a QoS flow identity (ID) of the QoS flow and a protocol data unit (PDU) session ID identifying a PDU session, wherein the PDU session comprises the data of the QoS flow; and
using the data notification message.

18. The apparatus according to claim 17, the operations further comprising:
sending information to the CU-UP, wherein the information is used to indicate that data of the QoS flow corresponds to a dedicated DRB instead of corresponding to the default DRB.

19. The apparatus according to claim 17, wherein the data packet of the QoS flow is not configured by a radio resource control (RRC) configuration with a mapping relationship between the QoS flow and a DRB, and is not configured with a reflective QoS indicating the mapping relationship between the QoS flow and the DRB.

20. The apparatus according to claim 17, wherein the communication apparatus is the CU-CP of the RAN.

* * * * *